United States Patent [19]

Allen

[11] Patent Number: 4,932,197
[45] Date of Patent: Jun. 12, 1990

[54] APPARATUS FOR POSITIONING A WORK IMPLEMENT

[76] Inventor: David R. Allen, 180 N. Fruit Ave., Fresno, Calif. 93706

[21] Appl. No.: 291,277

[22] Filed: Dec. 28, 1988

[51] Int. Cl.[5] .......................................... A01D 78/14
[52] U.S. Cl. ...................................... 56/377; 56/228
[58] Field of Search ................ 56/377, 228, 372, 376, 56/DIG. 21

[56] References Cited

U.S. PATENT DOCUMENTS

| | | |
|---|---|---|
| 358,735 | 3/1887 | Doan . |
| 532,079 | 1/1895 | Mathwich . |
| 1,249,648 | 12/1917 | McKinney . |
| 1,331,317 | 2/1920 | Burke . |
| 1,769,038 | 7/1930 | Ronning . |
| 1,877,770 | 9/1932 | Larson . |
| 1,897,581 | 2/1933 | McNab . |
| 1,898,694 | 2/1933 | Sikorsky . |
| 2,059,205 | 11/1936 | Buffington . |
| 2,165,619 | 7/1939 | Doeg . |
| 2,402,887 | 6/1946 | Greeley . |
| 2,540,100 | 2/1951 | Coeur . |
| 2,545,111 | 3/1951 | Schaubert . |
| 2,580,751 | 1/1952 | Fletcher . |
| 2,771,306 | 11/1956 | Ash . |
| 2,804,513 | 8/1957 | Oppel . |
| 2,896,392 | 3/1971 | Van Der Lely et al. . |
| 2,982,081 | 5/1961 | Cooley ................................. 56/377 |
| 3,031,634 | 5/1962 | Van Der Lely et al. ........ 56/377 X |
| 3,042,121 | 7/1962 | Broetzman . |
| 3,176,801 | 4/1965 | Huff . |
| 3,466,860 | 9/1969 | Winkel et al. ......................... 56/377 |
| 3,568,423 | 3/1971 | Hale et al. . |
| 3,778,987 | 12/1973 | Rankins . |
| 3,866,935 | 2/1975 | Nelson . |
| 3,879,923 | 4/1975 | Granger . |
| 3,893,283 | 7/1975 | Dandl . |
| 3,893,377 | 7/1975 | Mannetje . |
| 4,026,365 | 5/1977 | Andersson et al. . |
| 4,037,395 | 7/1977 | Henkensiefken et al. . |
| 4,077,189 | 3/1978 | Hering . |
| 4,166,353 | 9/1979 | Garrison ............................... 56/377 |
| 4,173,110 | 11/1979 | Hansen, Jr. . |
| 4,324,093 | 4/1982 | Van Der Lely et al. ............. 56/377 |
| 4,343,142 | 8/1982 | Allen . |
| 4,463,838 | 8/1984 | Jacottet . |
| 4,723,403 | 2/1988 | Webster ................................ 56/377 |

FOREIGN PATENT DOCUMENTS 2356623 11/1973 Fed. Rep. of Germany .

Primary Examiner—George A. Suchfield
Attorney, Agent, or Firm—Worrel & Worrel

[57] ABSTRACT

An apparatus having a frame adapted for earth traversing movement in a direction of travel and having portions laterally positionable with respect to the direction of travel, a work implement pivotally mounted on the laterally positionable portion of the frame for motion therewith relative to a predetermined axis through a range of selected operative positions, and a device for securing the work implement relative to the predetermined axis in a selected one of the operative positions for operation during movement of the frame along the path of travel.

17 Claims, 16 Drawing Sheets

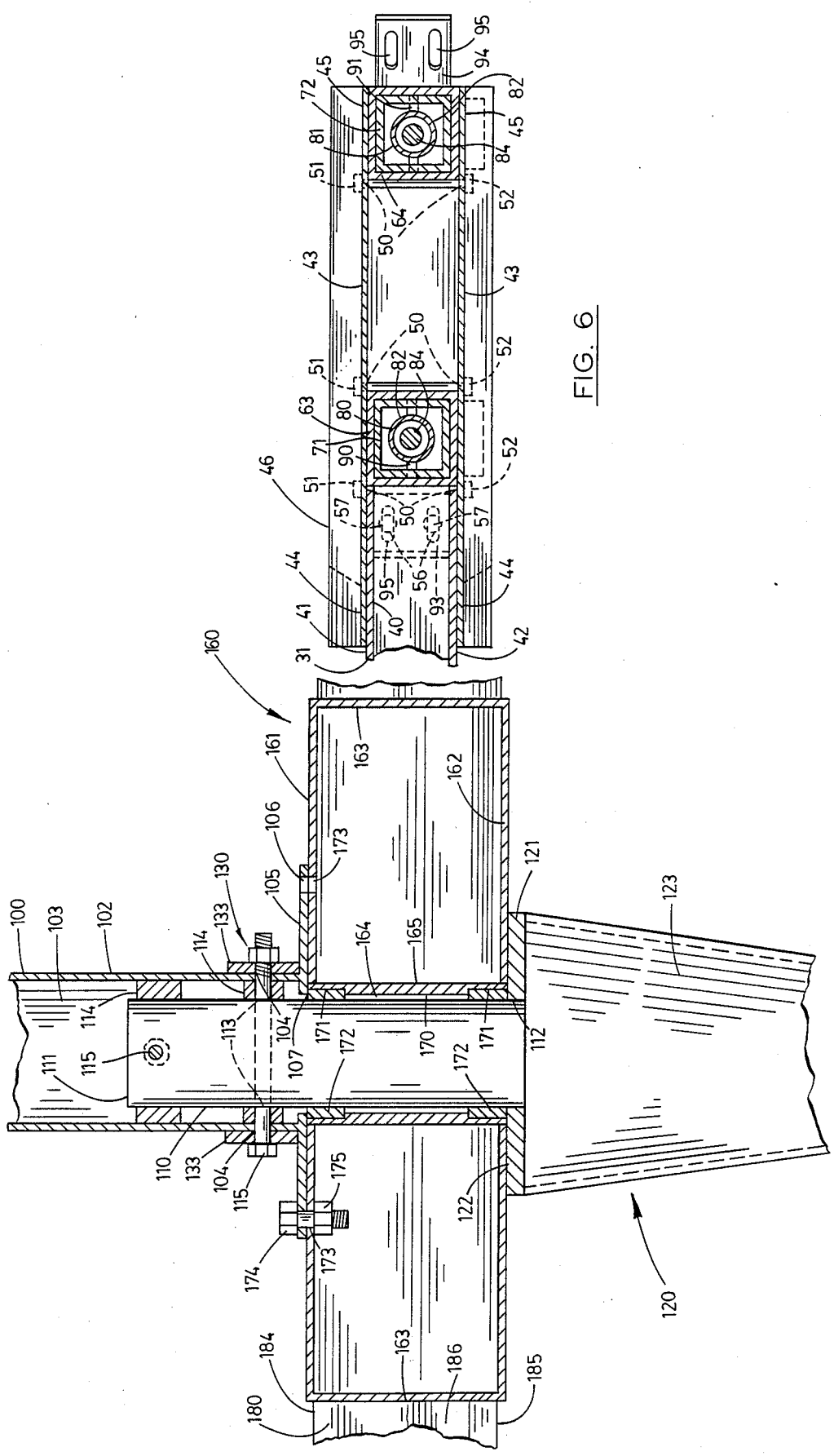

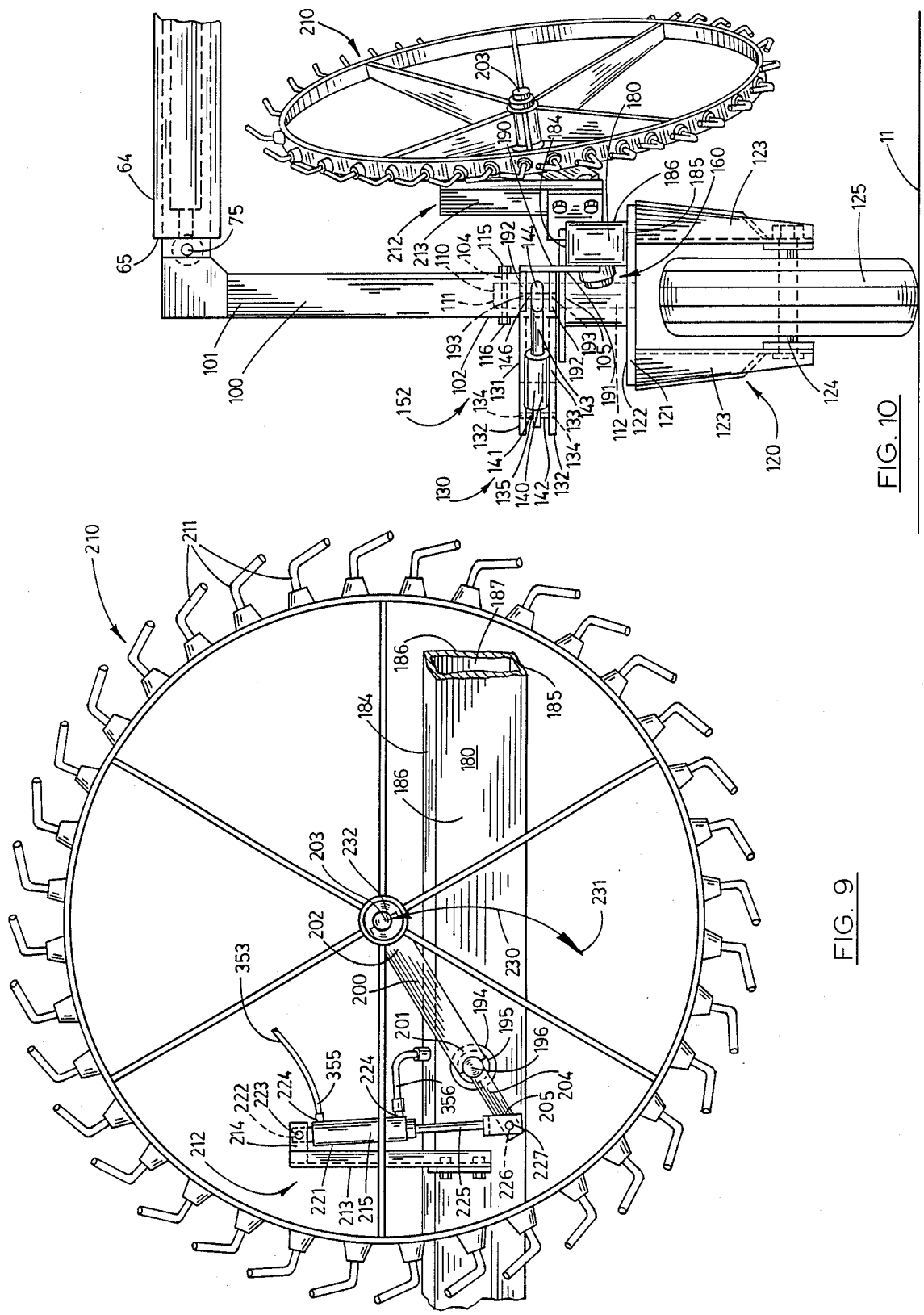

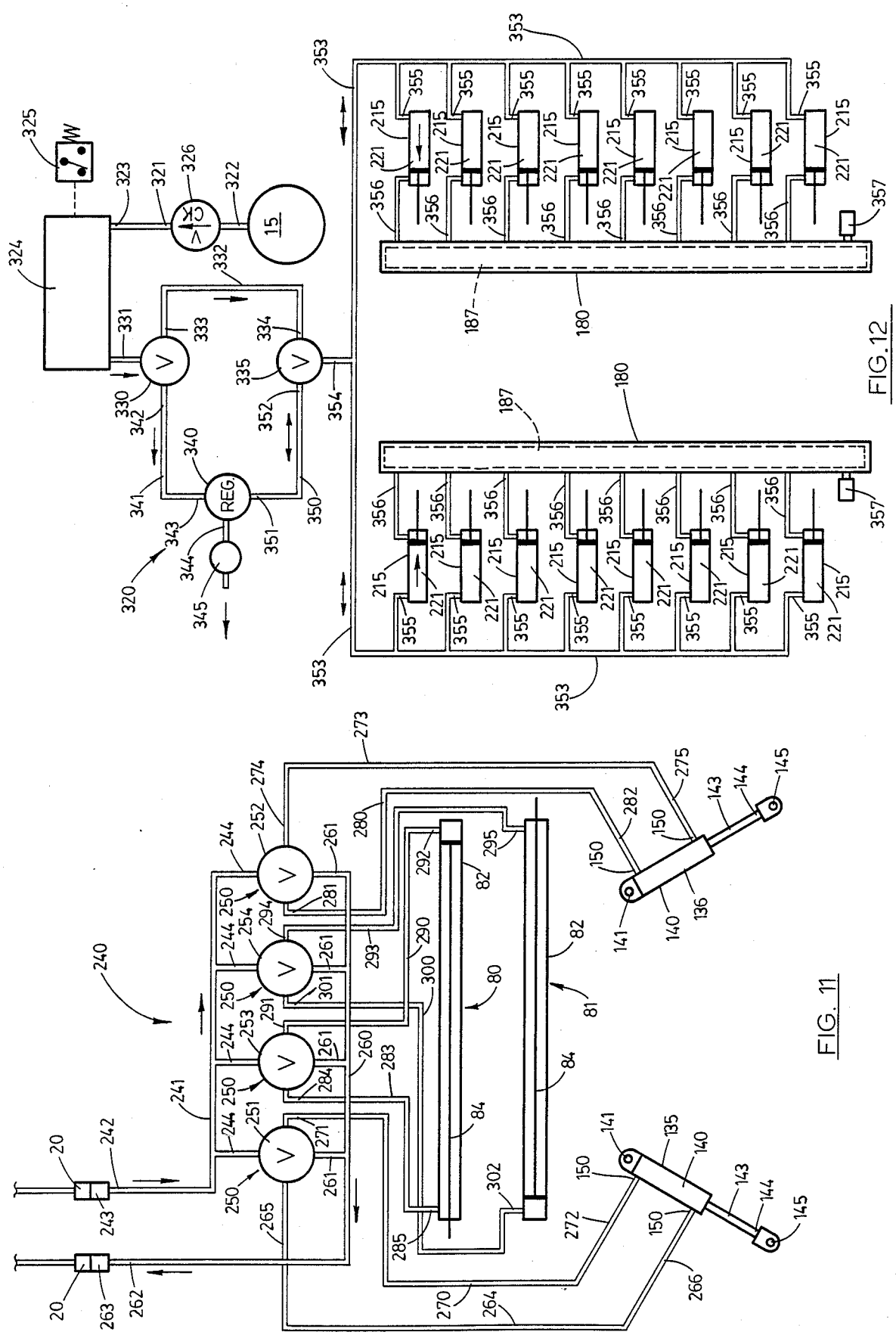

4,932,197

APPARATUS FOR POSITIONING A WORK IMPLEMENT

BACKGROUND OF THE INVENTION

1. Field of the Invention:

The present invention relates to an apparatus for positioning a work implement in predetermined operative positions and more particularly to an apparatus which has utility when employed to position variously designed hay rakes in selected operative positions relative to a predetermined path of travel, and with respect to a selected work surface, for the performance of assorted raking operations, the apparatus imparting improved performance characteristics to a hay rake which is so equipped.

2. Description of the Prior Art:

The beneficial effects of employing variously designed hay rakes for the purposes of performing the assorted tasks associated with the harvesting of a specific variety of crop have long been known. Such a hay rake is disclosed in Letters U.S. Pat. No. 4,343,142 to Allen. While hay rakes of various designs have operated with varying degrees of success, they commonly possess shortcomings which have detracted from their usefulness.

For example, hay rakes having the basket type, or alternatively, the wheel rake type design have heretofore been individually mounted on an earth traversing frame and adapted to be positioned in various attitudes with respect to a predetermined path of travel for purposes of performing assorted raking tasks on a selected crop, like hay. The objective of these devices has been to develop a hay rake apparatus which is operable to perform a variety of different raking operations individually suited to the drying conditions of the crop to be harvested or alternatively is utilized to rake the hay into windrows for subsequent retrieval from the field by a hay bailer.

The prior art devices have accomplished these assorted raking operations by being modified, in various manners, whenever a different type of raking operation is performed. In some instances, the individual hay rakes must be disconnected or otherwise disassembled from their individual support assemblies and repositioned relative to each other and with respect to the path of travel for the specific raking operation to be performed. In other instances the earth traversing frame, which mounts each of the hay rakes, is adjusted in a fashion such that the individual hay rake devices are disposed in predetermined spaced relation one with the other, and with respect to the path of travel, to perform various raking operations.

While these assorted modifications may individually, in some instances, be relatively easy to implement, the individual hay rake devices currently utilized present other problems which result from characteristics inherent in their design. For example, the prior art hay rakes have not been capable of being modified such that they can be rendered operable to rake a crop in an inwardly disposed direction, that is, towards the path of travel of the earth traversing frame. Further, the prior art devices have generally been difficult or time consuming to adjust for specific operational conditions. For example, wheel rakes are damaged from time to time when they individually encounter obstructions when disposed in operative positions, the commercially available wheel rakes being incapable of substantially rapid adjustment relative to a work surface while the rakes are in operation.

Therefore, it has long been known that it would be desirable to have an apparatus for positioning a work implement, and which has particular utility when installed as an operable subassembly on a hay rake, the apparatus operable substantially to reduce the time and labor required to modify such a hay rake for particular raking operations while simultaneously increasing the versatility of the hay rake with the attendant benefits to be derived from such increased versatility.

SUMMARY OF THE INVENTION

Therefore, it is an object of the present invention to provide an improved apparatus for positioning a work implement.

Another object of the present invention is to provide such an apparatus which has particular utility when installed as an operable subassembly of a hay rake, the apparatus adapted selectively to position the hay rake in operational positions relative to a predetermined work surface and a path of travel.

Another object of the present invention is to provide such an apparatus which is adapted when installed as an operable subassembly of a hay rake to increase the versatility thereof, the apparatus permitting the hay rake to rake a selected crop towards, or alternatively away from, the hay rakes path of travel.

Another object of the present invention is to provide such an apparatus which increases the speed and thoroughness with which raking operations can be conducted by a hay rake so equipped Another object of the present invention is to provide such an apparatus which can be operated to adjust the work implements relative to a predetermined path of travel and a work surface during continuous movement along the path of travel and without disassembly or manual repositioning of the work implements.

Another object of the present invention is to provide such an apparatus which can be utilized as an operational subassembly on both wheel type and basket type hay rakes.

Another object of the present invention is to provide such an apparatus which can readily be retrofitted to hay rakes of conventional design or alternatively can be manufactured as an integral subassembly thereof.

Another object of the present invention is to provide such an apparatus which is particularly well suited for use on dual hay rakes which have independently positionable hay rakes and which are both laterally separable and independently movable into selected attitudes relative to the direction of travel.

Another object of the present invention is to provide such an apparatus which is characterized by substantially carefree maintenance, ease of operation and installation and which is operable substantially to reduce the costs related to the raking and subsequent harvesting of a selected crop.

Another object of the present invention is to provide such an apparatus which is operable to obtain the individual benefits to be derived from related prior art devices while avoiding the detriments individually associated therewith.

Further objects and advantages are to provide improved elements and arrangements thereof in an implement for the purposes described which is dependable, durable, and effective in accomplishing its intended purposes.

These and other objects and advantages are achieved in the apparatus of the subject invention wherein, in the preferred embodiments, an earth traversing frame adapted for movement along a first path of travel pivotally mounts a support beam for motion relative to a predetermined axis through a range of selected operative positions, and a work implement is borne by the support beam for operation during movement along the first path of travel, the apparatus of the subject invention increasing the versatility and imparting improved performance characteristics to the work implement.

BRIEF DESCRIPTION OF THE DRAWINGS

FIG. 6 is a fragmentary, longitudinal vertical section taken from a position indicated by the line 6—6 of FIG. 1.

FIG. 7 is a fragmentary, longitudinal, vertical section taken along line 7—7 of FIG. 3.

FIG. 9 is a fragmentary side elevation of the first embodiment of the subject invention taken from a position along line 9—9 in FIG. 3.

FIG. 10 is a fragmentary, transverse, side elevation of the first embodiment of the subject invention taken from a position along line 10—10 in FIG. 5.

FIG. 11 is a schematic diagram of the hydraulic system of the first embodiment of the subject invention.

FIG. 12 is a schematic diagram of the pneumatic system of the first embodiment of the subject invention.

DESCRIPTION OF THE PREFERRED EMBODIMENT

First Form

Figure 1:
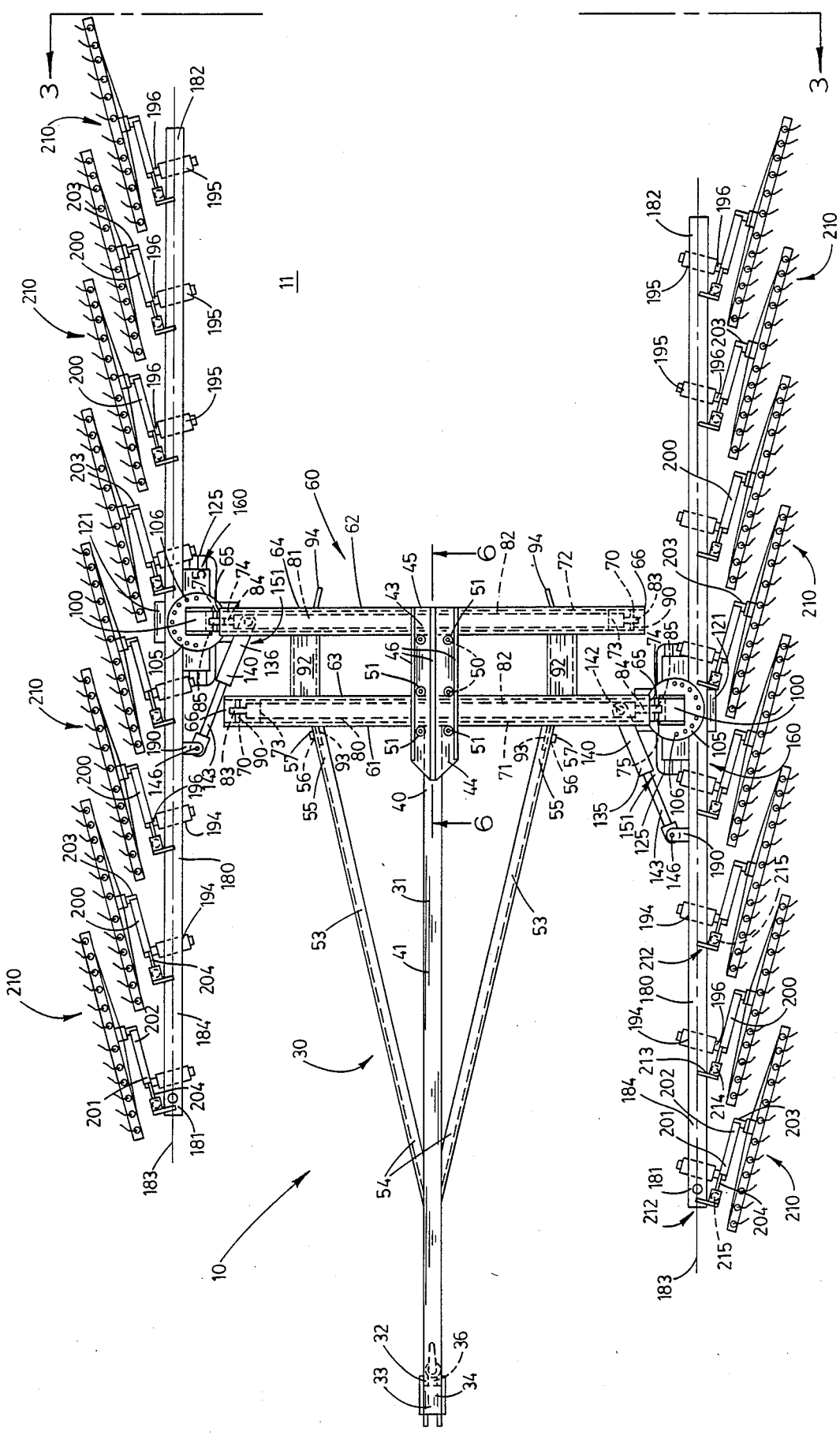
FIG. 1 is a top plan view of the first embodiment of the present invention and showing the work implements thereof disposed in substantially parallel spaced relation.

Referring more particularly to the drawings, the first form of the apparatus of the present invention is generally indicated by the numeral 10 in FIG. 1. For illustrative convenience, the first form of the apparatus is shown and described as it would be configured if it were manufactured as an integral component, or later installed, in the manner of a retrofit, on a wheel type hay rake. However, it will be readily recognized that the apparatus of the subject invention can be employed on a variety of other devices which have one or more implements that must be adjusted from one attitude to another relative to a work surface, and with respect to a predetermined path of travel.

As shown in the drawings, the first form of the invention 10 is operable to travel across the surface of the earth 11, in this case a field, one which has been cut and lays hay 12 which may have previously been raked into windrows 13. A tractor which is generally indicated by the numeral 14, is adapted to tow the apparatus 10 through the field and along roadways, as will hereinafter be described in greater detail. It will be understood that the tractor, in accordance with common construction, has a self-contained hydraulic system, not shown, and mounts a compressor 15 both of which individually power selected work implements pulled by the tractor. For this purpose, the tractor mounts a pair of couplings 20 which communicate with the hydraulic system of the tractor for the connection of the hydraulic lines of such work implements thereto. When towed by the tractor, the apparatus is adapted to move in opposite first and second directions 21 and 22 along a path of travel 23. This is best illustrated by reference to FIGS. 4 and 5.

As can best be seen by reference to FIG. 1, a towing assembly, which is generally indicated by the numeral 30, has a centrally disposed tubular beam 31 with a first end 32. Mounted in close proximity to the first end of the beam 31 is a hitch member 33 which is operable, of course, releasably to be connected to the rear of the tractor 14 in a manner well understood by those familiar with this art field. The hitch member 33 is mounted on a beam 34 which is affixed by welding or other fastening techniques to the first end 32 of the beam 31. The beam 34 is disposed in a substantially normal attitude with respect to the surface of the earth 11 and the beam 31. The beam 34 has a distal end 35, and a landing leg 36 is mounted thereon and is operable to position the hitch member 33 in predetermined spaced relation to the surface of the earth 11 when the apparatus 10 is not being utilized.

The beam 31 has a second end 40 and top and bottom surfaces indicated by the numerals 41 and 42, respectively. As best illustrated by reference to FIG. 6, a pair of mounting plates 43 individually are mounted on the top and bottom surfaces, respectively, and are substantially coaxially aligned with the beam 31. Each mounting plate 43 has a proximal end and a distal end 44 and 45, respectively, and further, each mounting plate has three substantially equally spaced ribs 46 which individually impart additional strength to same. A plurality of orifices 50 are formed in each of the mounting plates in predetermined positions and further are individually disposed in substantial registry and coaxial alignment with the orifices formed in the adjacent plate. A plurality of bolts 50 are individually and slidably received through each of the aligned orifices and appropriately dimensioned nuts 52 are individually screw-threadably received on each bolt thereby securing the individual mounting plates together and also securing the tubular beam 31 to the central or main frame which will hereinafter be discussed in greater detail. The towing assembly mounts a pair of sloped sections 53 which individually have first ends 54 that are affixed by welding to the tubular beam 31, and opposite second ends 55 which individually have formed therein a pair of orifices 56 which are individually adapted to receive suitably dimensioned bolts 57. As best understood by a study of FIGS. 4 and 5, the towing assembly is operable to tow the central or main frame 60 in the first or second direction 21 or 22, respectively.

The apparatus 10 has a central or main frame 60 with a forward facing portion 61 and a rearward facing portion 62. The main frame 60 includes spaced first and second tubular beams 63 and 64, respectively, each of which has a mouth portion 65 and an opposite end portion 66. The respective mouth portions 65 of the first and second tubular beams are disposed in opposite directions laterally of the apparatus, as best shown in FIG. 1, and are preferably manufactured of substantially square shaped stock. Coaxially aligned orifices 70 are individually formed in the opposite end portions 66, and are adapted individually to receive locking pins which will hereinafter be described in greater detail. Third and fourth tubular beams 71 and 72 are individually and telescopingly received internally of each of the first and second tubular beams and are further preferably manufactured from the same or similar square cross-sectional shape. The third and fourth tubular beams also have opposite first and second ends 73 and 74, respectively. Further, substantially coaxial aligned orifices 75 are formed in close proximity to the second end of each of the third and fourth tubular beams, respectively.

As best understood by a study of FIGS. 1 and 6, first and second hydraulic cylinders 80 and 81 are individually mounted internally of the first and second tubular beams 63 and 64 and are operable, upon expansion and contraction, coaxially to extend or retract the third and fourth tubular beams, as appropriate. The first and second hydraulic cylinders each have a cylinder portion 82 which has an orifice or channel 83 formed therein, and an extendable portion or ram 84. The rams 84 also have a channel or orifice 85 of like dimension formed in their distal end. A pin 90 slidably is received in mating relation in each of the coaxial aligned orifices 70 formed in the opposite end portions 66 of the first and second tubular beams 63 and 64 and further are individually received through each orifice 83 formed in the individual cylinder portions of each hydraulic cylinder 80 and 81, respectively. The pins 90, of course, secure the cylinder portions to the first and second tubular beams 63 and 64, respectively. Further, each of the rams 84 individually are secured to the second end 74 of the third and fourth tubular beams 71 and 72, respectively, by a pin 91. The pins 91 are individually and slidably received through each of the coaxially aligned orifices 85 formed in each of the rams 84 and through the coaxially aligned orifices 75 formed in the second end of the third and fourth tubular beams.

The first and second tubular beams 63 and 64 are interconnected by a pair of longitudinal beams 92 extending therebetween in spaced substantially parallel relation. First and second pairs of towing brackets 93 and 94 respectively are individually mounted in predetermined locations on the forward and rearward portions 61 and 62 and are adapted releasably to mate with the towing assembly 30. In particular, each towing bracket has a pair of orifices 95 formed therein which are disposed in predetermined positions such that they will individually coaxially align with the orifices 56 which are formed in the second ends 55 of the individual sloped sections 53. The bolts 57, of course, secure the individual sloped sections to each of the towing brackets 93 or 94 as appropriate. The towing brackets permit the towing assembly selectively to be mounted to the first and second portions thereby permitting the apparatus 10 to be towed in opposite directions along the path of travel 23.

Figure 8:
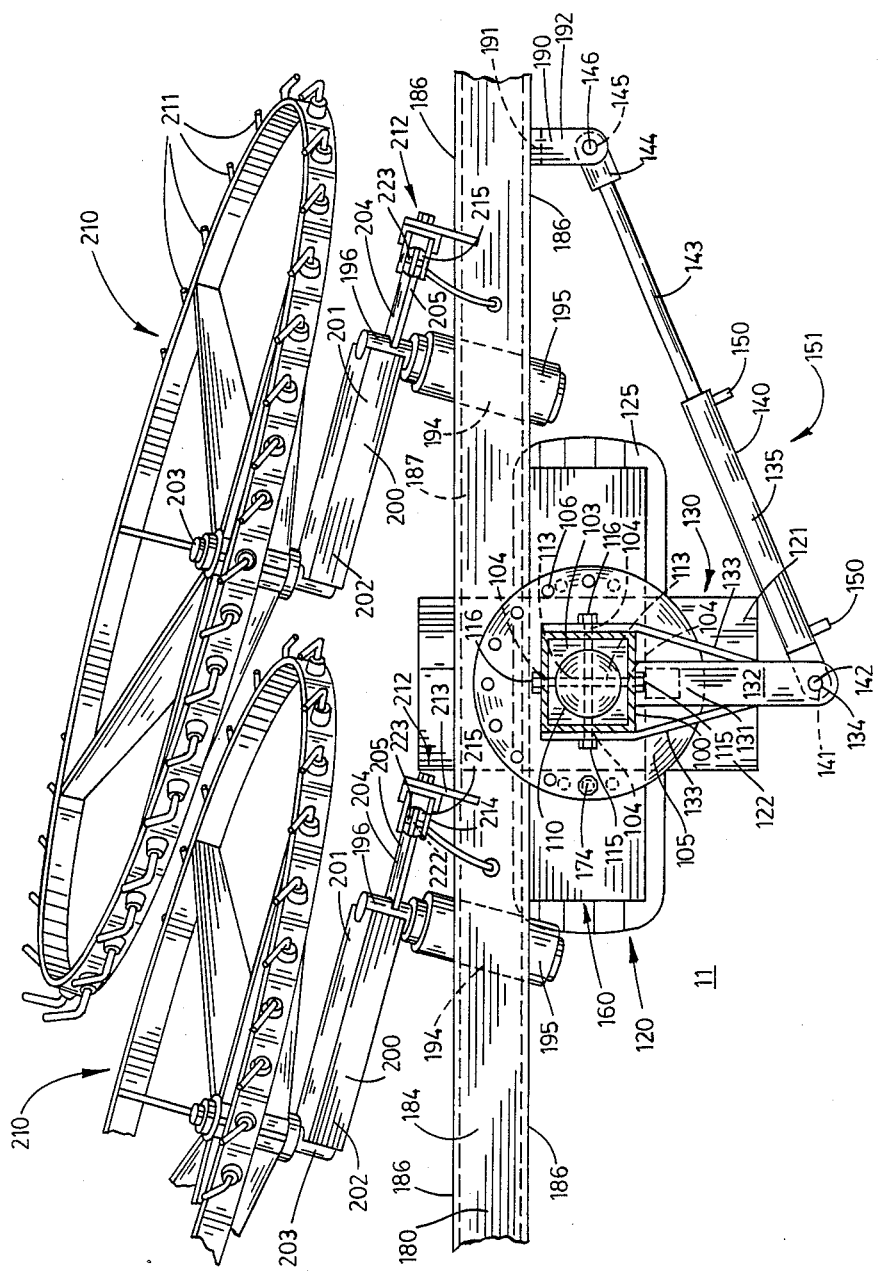
FIG. 8 is a fragmentary plan view of the first embodiment of the subject invention taken from a position along line 8—8 of FIG. 3.

Mounted to the second end 74 of the third and fourth tubular beams 71 and 72, respectively, is a support member 100 which is disposed in a substantially normal attitude thereto and which further has a proximal end 101 affixed to the respective tubular beam, and a distal end 102. The individual support members 100 are substantially square in their cross-sectional shape and further define a channel 103. As best seen by reference to FIG. 7, the distal end 102 of each of the support members has two pairs of substantially coaxial aligned orifices 104 formed in predetermined attitudes therein. A substantially circular plate 105 is individually affixed, by utilizing welding, to the distal end 102 of each support member. As best illustrated by reference to FIGS. 7 and 8, the plate has a plurality of orifices 106 of predetermined dimension formed in locations closely adjacent to the peripheral edge thereof, and a single large opening 107 is formed substantially centrally of each plate.

A pivot, or axle 110 is mounted to each support member 100. The individual pivots are substantially circular in their cross-sectional dimension and have a first end 111 which is affixed to the distal end 102 of each of the support members and a second end 112. Two substantially transversely disposed channels 113 are individually formed in the first end of each of the pivots and are individually disposed in substantially right-angular attitudes one to the other such that they are rendered capable of being disposed in substantially coaxial alignment with the two pairs of orifices 106 which are formed in the distal end of each of the support members 100. A pair of spacers 114 are received about each of the pivots and are adapted to position the individual pivots substantially centrally of each of the channels 103, and a pair of bolts and their accompanying nuts 115 and 116, respectively, are individually and slidably received through the coaxially aligned orifices 104 and in the channels 113, respectively, thereby securing the individual pivots to the distal ends of each of the support members.

A pair of earth engaging wheel assemblies 120 are individually mounted to the central or main frame 60 and thus permit the main frame 60 to move across the surface of the earth 11. The individual wheel assemblies 120 have a support plate 121 which is disposed in a substantially horizontal attitude and which is affixed, by utilizing welding, to the second end 112 of each pivot 110. The support plate 121 further has a top surface 122, and a pair of substantially vertically disposed support members 123 depend downwardly in predetermined spaced substantially parallel relation therefrom. An axle assembly 124 of conventional design interconnects the vertically disposed supports and is operable to mount for rotational movement a conventionally designed earth engaging wheel 125.

A pair of support brackets, which are generally indicated by the numeral 130, are individually releasably mounted to the distal end 102 of each of the support members 100. Each support bracket has a substantially U-shaped member 131 which has a pair of spaced substantially parallel arms 132. Each of the support brackets 130 further has a pair of angulated reinforcement members 133 which are individually secured at one end to the individual support members by one of the bolts 115 and are secured at the opposite end to the U-shaped member 131 by utilizing welding. A pair of substantially coaxially aligned orifices 134 are individually formed in each of the arms 132. Third and fourth hydraulic cylinders 135 and 136, respectively, are releasably mounted to each of the support brackets and have individual cylinder portions 140. Each cylinder portion has an orifice 141 formed in its distal end, and an appropriately dimensioned pin 142 is operable to be received in the orifices 134 and 141, respectively, thereby securing the individual cylinder portions 140 to each of the support brackets 130. Each hydraulic cylinder 135 and 136 has an extendable portion or ram 143 which is, of course, selectively extendable and retractable, and has a distal end 144 which further has an orifice 145 formed therein. A pin 146 is operable to be received in the orifice 145 and is thereby operable to attach each of the rams to an individual receiving bracket which will hereinafter be discussed in greater detail. Each cylinder portion mounts a pair of appropriately dimensioned hydraulic fluid ports 150 which individually permit the fluid communication of the individual cylinder portions 140 with the hydraulic system of the apparatus 10. The hydraulic system of the apparatus 10 will also be discussed in greater detail hereinafter. The support brackets are disposed in inwardly facing relation relative to the main frame 60, and a second position 152, wherein they are disposed in outwardly facing relation relative to the main frame 60.

A pair of housings generally indicated by the numeral 160 individually are mounted for selective rotational movement on and about the individual pivots 110. Each housing has a top and bottom surface 161 and 162, respectively, which are interconnected by a pair of side walls 163; and a centrally disposed passageway 164 is formed in each of the housings and is defined by a substantially cylindrically shaped conduit or pipe 165. The conduit 165 has an inside surface 170 that has formed therein two spaced apart and recessed portions 171. The recessed portions, which are annular in shape, are individually operable to receive a bearing 172 which is of traditional design. The bearings, of course, permit the individual housings 160 freely to rotate about the individual pivots 110. As best illustrated by reference to FIG. 7, a plurality of orifices 173 are formed in the top surface 161 and are positioned such that upon rotation of the individual housings the orifices 173 periodically become coaxially aligned, or otherwise disposed in substantial registry with the individual orifices 106 which are formed in each of the plates 105. A bolt with its corresponding nut 174 and 175, respectively, are slidably received in the orifices which are so aligned thereby permitting an operator, not shown, to position and thereafter secure the individual housings in selected attitudes relative to the path of travel 23.

A pair of support beams, generally indicated by the numeral 180, are individually affixed to each housing 160 and are thereby rendered operable for selective positioning relative to the path of travel 23. Each of the support beams has opposed first and second ends 181 and 182, respectively, and a longitudinal axis generally indicated by the line labeled 183. Further, each of the beams has a top and bottom surface 184 and 185, respectively, which are connected together by spaced substantially parallel side walls 186. Each beam further has an internal cavity 187. As best seen by reference to FIG. 10, each support beam mounts on one of its side walls 186 an attachment bracket 190 which is operable to receive the distal end 144 of each of the rams 143. Each attachment bracket has a substantially vertically disposed member 191 which mounts at its upper or distal end a pair of short plates 192 which are disposed in spaced substantiallY parallel relation one with the other. A pair of substantially coaxially aligned orifices 193 are individually formed in each of these plates 192. The distal end of each of the rams is secured to the attachment bracket by passing the pin 146 through the orifices 193 and 145, respectively. As best illustrated by reference to FIG. 1, and when the third and fourth hydraulic cylinders are substantially fully extended, the rams individually are operable to position the respective support beams in substantially parallel relation to the direction of travel, and upon contraction, the rams are operable to cause the first end of each of the support beams to move into selected attitudes right-angularly related to the path of travel 23. A plurality of channels 194 are formed in each of the support beams and are angularly disposed with respect to the longitudinal axis 183. The plurality of channels 194 further are disposed in substantially equally spaced parallel relation one with the other. A bearing housing 195 is secured in each of the channels and a pluralitY of spindles 196 are individually mounted for rotational movement therein. This is best illustrated by reference to FIG. 8.

Each of the spindles 196 individually mounts an arm 200, which is disposed in a substantially normal attitude thereto. Each arm further has a first end 201 which is affixed to the spindle by utilizing welding or the like, and a second end 202 which mounts a short axle 203. Further, a short shaft 204 is mounted to each of the spindles and is disposed in a substantially normal attitude with respect to the spindle and in substantially coaxial alignment with each of the arms 200. The shafts each have a distal end 205. A plurality of wheel rakes 210 are individually mounted in rotatable mating relation on each of the axles 203. The wheel rakes 210, which are familiar to those skilled in the art, mount a plurality of crop engaging tines 211. The wheel rakes, of course, are rendered operable when they are individually disposed in tactile contact with the surface of the earth 11, and movement of the main frame 60 along the path of travel 23 causes the individual wheel rakes to rotate thereby producing the desired raking action. A plurality of support frames 212 are individually mounted in predetermined spaced relation to each of the bearing housings 195 and have a vertically disposed first portion 213, and a substantially horizontally disposed second portion 214. Affixed to, and depending downwardly from each of the second portions are individual air cylinders, generally indicated by the numeral 215.

The air cylinders 215 are of conventional design and have cylinder portions 221, and a mounting orifice 222 is formed in the distal end of each of the cylinder portions. A locking pin 223 is received in each of the orifices 222 and is adapted to mount the individual cylinder portions to the second portion 214 of the individual support frames 212. This is best seen by reference to FIG. 8. As can best be seen by reference to FIGS. 9 and 12, each of the cylinder portions 221 mounts a pair of air connector ports 224 which permits the individual cylinder portions to be joined in fluid communication with a source of compressed air which will hereinafter be discussed in greater detail. Each air cylinder 215 has a ram or extendable portion 225. Each ram further has an orifice 226 formed in its distal end, and a pin 227 is received in the orifice 226 and is adapted to engage the distal end 205 of the shaft 204. This is best illustrated by reference to FIG. 9. The individual air cylinders, upon expansion and contraction, define the range of movement of the individual arms 200 along a second path of travel which is generally indicated by the numeral 230. The second path of travel 230, which is substantially arcuate in shape, has a lowermost position 231 and an uppermost position 232. For example, each air cylinder, upon contraction, permits the individual arms to move into the lowermost position along the second path of travel and upon reaching the lowermost position the air cylinders are individually operable to exert sufficient force on the shaft substantially to counterbalance the effect of gravity which is acting upon each of the wheel rakes 210. Further, and upon expansion, each of the air cylinders is operable to move the individual arms along the second path of travel and into an uppermost position whereby the individual wheel rakes are disposed in spaced relation to the surface of the earth. The individual wheel rakes, when disposed in the lowermost position, are operable to be positioned in such an attitude that the tines 211 are disposed in tactile contact with the surface of the earth and movement of the central or main frame 60 has the effect of causing the individual wheel rakes to rotate and thus perform the desired raking action.

A hydraulic system, which is generally indicated by the numeral 240, is operable to interconnect the first, second, third and fourth hydraulic cylinders 80, 81, 135 and 136, respectively, in fluid communication with the hydraulic system of the tractor 14, not shown. The hydraulic system 240 has a first hydraulic conduit 241 which has a fluid intake end 242 which mounts a conventional coupler 243. The coupler, of course, mounts the first hydraulic conduit 241 in fluid communication with one of the couplings 20 which are individually mounted on the tractor 14. Further, the first hydraulic conduit 241 has four fluid discharge ends 244 which are individually disposed in fluid communication with a plurality of hydraulic control valves, which are generally indicated by the numeral 250. The hydraulic control valves 250 include a first, second, third and fourth valves 251, 252, 253 and 254, respectively. A second hydraulic conduit, which is generally indicated by the numeral 260, also connects the individual hydraulic control valves 250 in fluid communication with the hydraulic system of the tractor 14. The second hydraulic conduit has four fluid intake or first ends 261, which are individually connected in fluid communication with the first, second, third, and fourth valves, 251, 252, 253 and 254, respectively, and a second fluid discharge end 262 which mounts a coupler 263 which engages one of the couplers 20 which is mounted on the tractor. A third hydraulic conduit 264 connects the first valve 251 with the third hydraulic cylinder 135. The third hydraulic conduit has a first end 265 which is mounted in fluid communication with the first valve 251 and an opposite, second end 266, which is connected in fluid communication with one of the hydraulic fluid ports 150 of the third hydraulic cylinder 135. This is most clearly seen by reference to FIG. 11.

A fourth hydraulic conduit, which is generally indicated by the numeral 270, connects the first valve 251 in fluid communication with the third hydraulic cylinder 135. The fourth hydraulic conduit has a first end 271 which is mounted in fluid communication with the first valve and an opposite second end 272 which is connected in fluid communication with one of the hydraulic ports 150 that is mounted on the third hydraulic cylinder 135. A fifth hydraulic conduit 273 connects the second valve 252 in fluid communication with the fourth hydraulic cylinder 136. The fifth hydraulic conduit has a first end 274 which is disposed in fluid communication with the second valve, and an opposite second end 275 which is mounted in fluid communication with one of the hydraulic ports 150 that is mounted on the fourth hydraulic cylinder. A sixth hydraulic conduit, which is generally indicated by the numeral 280, connects the second valve 252 in fluid communication with the fourth hydraulic cylinder 136. It similarly has a first end 281 that is disposed in fluid communication with the second valve, and an opposite end 282, which is disposed in fluid communication with one of the hydraulic ports 150 which is mounted on the fourth hydraulic cylinder. A seventh hydraulic conduit, which is generally indicated by the numeral 283, has a first end 284 which is disposed in fluid communication with the third valve 253, and a second or opposite end 285 which is disposed in fluid communication with the first hydraulic cylinder that is generally indicated by the numeral 80. Further, an eighth hydraulic conduit, which is generally indicated by the numeral 290, has a first end 291 that is disposed in fluid communication with the third valve 253 and an opposite second end 292 which is disposed in fluid communication with the first hydraulic cylinder 80.

Figure 3:
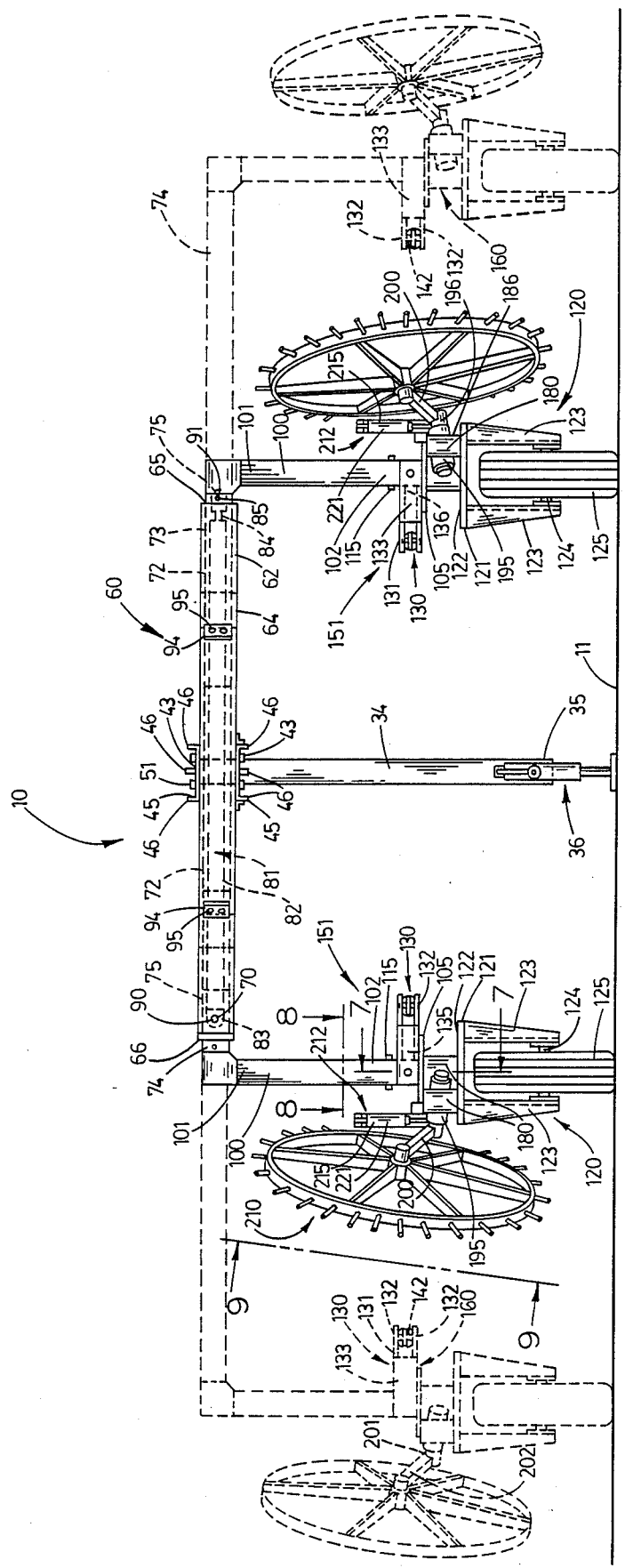
FIG. 3 is a side elevation of the first embodiment of the subject invention taken from a position along line 3—3 of FIG. 1 and showing the work implements in phantom lines in extended operative positions.

A ninth hydraulic conduit, which is generally indicated by the numeral 293, is mounted in fluid communication with the second hydraulic cylinder 81. The ninth hydraulic cylinder has a first end 294 that is disposed in fluid communication with the fourth valve 254, and an opposite, second end 295 which is disposed in fluid communication with the second hydraulic cylinder 81. A tenth hydraulic conduit 300 has a first end 301 which is disposed in fluid communication with the fourth valve 254 and a second end 302 that is disposed in fluid communication with the second hydraulic cylinder 81. It will be readily apparent after a study of FIG. 11 that when the first and second valves 251 and 252, respectively, are individually actuated by the operator (not shown), hydraulic pressure is permitted selectively to be supplied to the third and fourth hydraulic cylinders, respectively, thereby causing the individual rams 143 selectively to be positioned relative to the respective cylinder portions 140. The third and fourth hydraulic cylinders 135 and 136 are operable selectively to position the individual support beams into predetermined positions relative to the path of travel 23. Further, the selective activation of the third and fourth hydraulic valves 253 and 254, respectively, permits hydraulic pressure selectively to be supplied to the first and second hydraulic cylinders 80 and 81, respectively, thereby causing each of the rams 84 selectively to position the individual third and fourth tubular beams in selected attitudes laterally of the apparatus 10. This is best illustrated by reference to FIG. 3.

As best understood by a study of FIG. 12, the pneumatic system of the subject invention is generally indicated by the numeral 320. As earlier discussed, a compressor 15 is mounted on the tractor 14 and is operable to provide a source of compressed air for use in powering various agricultural implements. The compressor is of conventional design and is connected in fluid communication with a first pneumatic conduit 321 which has a first end 322 and a second end 323. Mounted in fluid communication with the second end 323 is a compressed air reservoir or tank 324 which is adapted to store the compressed air produced by the compressor. A regulator switch, which is generally indicated by the numeral 325 is mounted in pressure sensing relation on the reservoir 324 and is adapted to regulate the operation of the compressor such that the compressed air pressure in the reservoir is maintained at a predetermined level. The operation of the regulator switch is well understood by those skilled in the art and therefore for the sake of brevity is not discussed in significant detail herein. A flow control check valve 326 is mounted in fluid impeding relation with respect to the first pneumatic conduit 321. As shown most clearly in FIG. 12, the flow control check valve 326 permits the substantially unimpeded flow of compressed air in the direction of the reservoir and prevents movement of the compressed air in the opposite direction, that is, towards the compressor 15.

A three-way valve is schematically illustrated in FIG. 12 and is generally designated by the numeral 330. The three-way valve is connected in fluid communication with the reservoir 324 by a second pneumatic conduit 331. The three-way valve, which is controlled by the operator, not shown, is adapted to direct the source of air pressure into a third pneumatic conduit 332. The third pneumatic conduit has a first end 333 which is connected in fluid communication with the three-way valve 330 and has an opposite, second end 334, which is disposed in fluid communication with a shuttle valve 335. The shuttle valve is of conventional design and is rendered operable when it is exposed to a pressure gradient. A regulator, which is generally indicated by the numeral 340, is mounted in fluid communication with the three-way valve 330 by a fourth pneumatic conduit 341. The fourth pneumatic conduit has a first end 342 which is disposed in fluid communication with the three-way valve, and further has a second end 343 which is disposed in fluid communication with the regulator. The regulator which is adjusted by the operator, not shown, is adapted to receive compressed air which is released by the three-way valve into the fourth pneumatic conduit 341. A pressure release conduit 344 is mounted in fluid communication with the regulator, and a quick exhaust valve 345 is mounted in fluid impeding relation on the pressure release conduit. The pressure release conduit communicates with the ambient atmosphere and is operable to release air pressure from the pneumatic system 320. This feature will hereinafter be discussed in greater detail.

The regulator 340 is connected in fluid communication with the shuttle valve 335 by a fifth pneumatic conduit, which is generally indicated by the numeral 350. The fifth pneumatic conduit has a first end 351, which is connected in fluid communication with the regulator 340, and a second end 352 which is mounted in fluid communication with the shuttle valve 335. A sixth pneumatic conduit, generally indicated by the numeral 353, has a first end 354 which is connected in fluid communication with the shuttle valve 335 and a plurality of second ends 355 which are mounted in fluid communication with the individual air cylinders 215. A seventh pneumatic conduit, which is generally indicated by the numeral 356, is mounted in fluid communication on each of the cylinder portions 221 and further is connected in fluid communication with the internal cavity 187 of the individual support beams 180. An exhaust filter 357 is mounted in fluid communication with the internal cavity 187 of the individual support beams 180 and is operable to prevent dust and other debris from being drawn inside the cavity. This is best illustrated by reference to FIG. 12.

The air cylinders 215, as earlier discussed, are individually operable to position each of the wheel rakes 210 in predetermined positions along the second path of travel 230. For example, if the operator, not shown, desires to position each of the wheel rakes in the uppermost position 232, then in that event the operator would operate the three-way valve 330 in such a fashion that the compressed air would exit the reservoir 324, and would enter into the third pneumatic conduit 332. Upon entering the third pneumatic conduit, the air pressure would cause the shuttle valve 335 to move into or otherwise assume a position in fluid-impeding relation with respect to the fifth pneumatic conduit 350. The compressed air would then enter into the sixth pneumatic conduit 353 where it would be substantially evenly distributed to the individual air cylinders 215. The air pressure upon entering each of the cylinder portions 221 would cause the individual rams 225 to move outwardly thereby urging each of the wheel rakes along the second path of travel 230 and into the uppermost position. This can best be imagined by a study of FIG. 9 and FIG. 12. Further, and if the operator desires to move each of the wheel rakes into an operative position along the second path of travel and intermediate the uppermost and lowermost positions for purposes of performing a specific raking operation, then in that event, the operator would adjust the three-way valve such that air pressure is released from the reservoir 324 and diverted into pneumatic conduit 341. This air pressure is, of course, received at the regulator 340.

The regulator is operable to release the air pressure supplied by the fourth pneumatic conduit 341 into the fifth pneumatic conduit 350. However, if the air pressure residing in the sixth pneumatic conduit 353 is greater than the air pressure in the fourth pneumatic conduit 341, the shuttle valve 335, in response to the pressure gradient, would be urged into fluid-impeding relation with respect to the third pneumatic conduit 332, and the air pressure would move into the fifth pneumatic conduit 350 where it would escape through the pressure release conduit 344 and would subsequently be expelled to the immediate environment through the quick exhaust valves 345. Air pressure would continue to exit through the pressure release conduit 344 until such time as the air pressure in the fourth pneumatic conduit 341 equals the air pressure in the sixth pneumatic conduit. Further, the regulator is operable to supply the source of air pressure from the pneumatic conduit 341 into the pneumatic conduit 350.

This air pressure, so delivered, moves the shuttle valve 335 into fluid-impeding relation with respect to the second end 334 of the third pneumatic conduit 332. In this manner air pressure is supplied to the sixth pneumatic conduit 353. Upon release of air pressure from each of the air cylinders 215, the rams or extendable portions assume a retracted position. The individual air cylinders 215 limit the movement of each of the rams 225 into the retracted position internally of the cylinder portion 221. The individual pneumatic cylinders are also individually operable to limit the movement of the individual wheel rakes along the second path of travel, that is the air cylinders prevent the wheel rakes from moving beyond the lowermost position 231. The air cylinders as earlier discussed are adapted to counterbalance the effects of gravity acting upon the individual wheel rakes thereby correctly positioning each of the wheel rakes with respect to the surface of the earth. This is best understood by a study of FIGS. 9 and 12.

SECOND FORM

Figure 13:
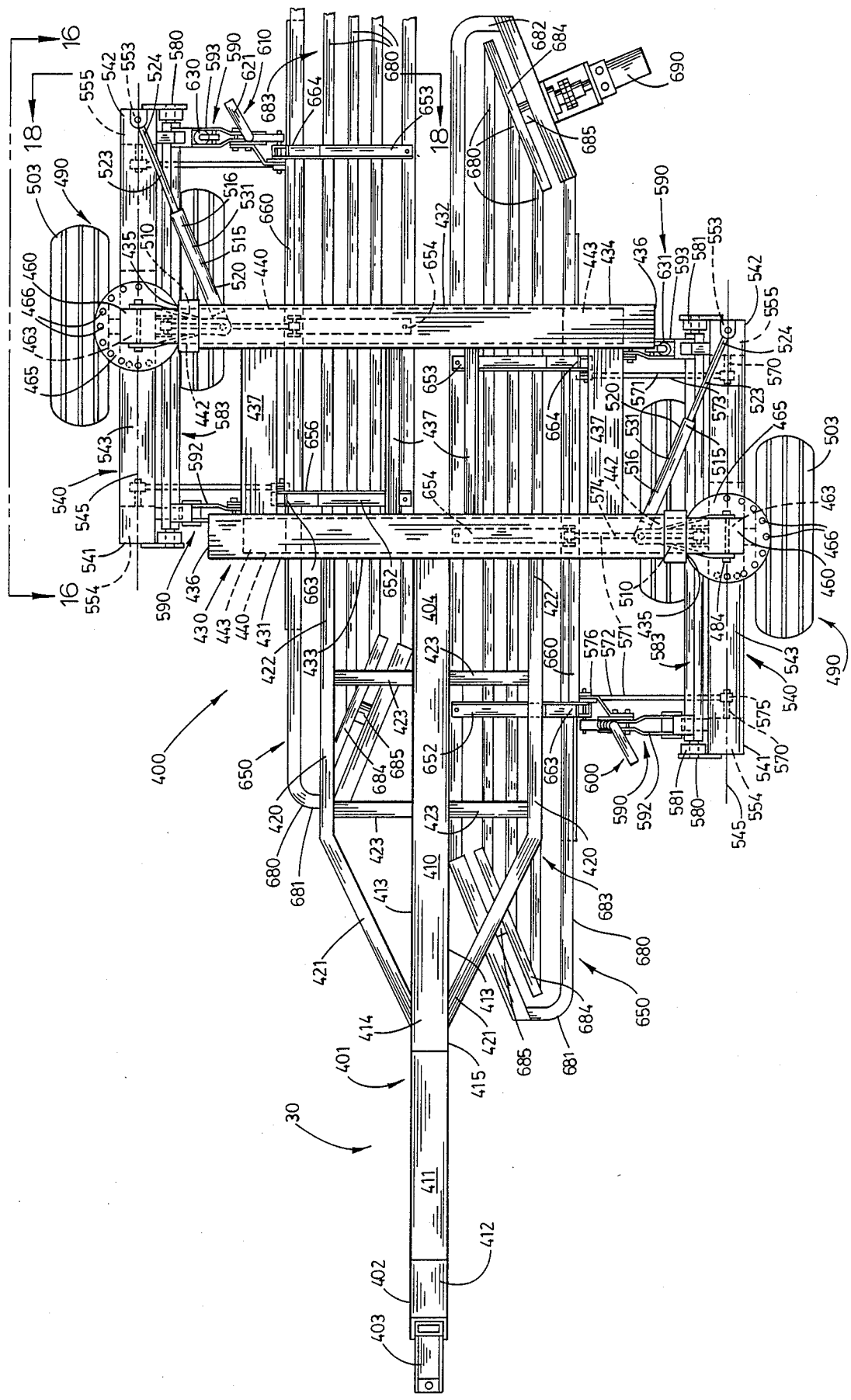
FIG. 13 is a top plan view of the second embodiment of the present invention and showing the work implements thereof disposed in substantially side by side relation.

Referring more particularly to the drawings, the second form of the apparatus of the present invention is generally indicated by the numeral 400 in FIG. 13. For illustrative convenience, the second form of the apparatus is shown and described herein as it would be configured if it were manufactured as an integral component, or later installed in the manner of a retrofit, on a so-called basket or rotary type hay rake. However, it will be readily recognized that the apparatus of the subject invention can be employed on a variety of other devices which have one or more implements that must be adjusted from one attitude to another relative to a work surface and with respect to a predetermined path of travel 23.

As shown in the drawings, the second form of the invention 400 is operable to travel across the surface of the earth 11, in this case a field on which has been cut or laid hay 12 which may have been previously raked into windrows 13. A tractor, which is generally indicated by the numeral 14, is adapted to tow the apparatus 400 through a field and along roadways as will hereinafter be described in greater detail. The tractor is of conventional design having a self-contained hydraulic system, not shown and mounting a compressor 15, both of which are individually operable to power selective work implements pulled by the tractor. As noted earlier, the tractor mounts a pair of couplings 20 which communicate with the hydraulic system of the tractor for connection of the hydraulic lines of such work implements thereto. When towed by the tractor, the apparatus is adapted to move along the path of travel 23. This is best illustrated by reference to FIGS. 14 and 15, respectively.

Figure 14:
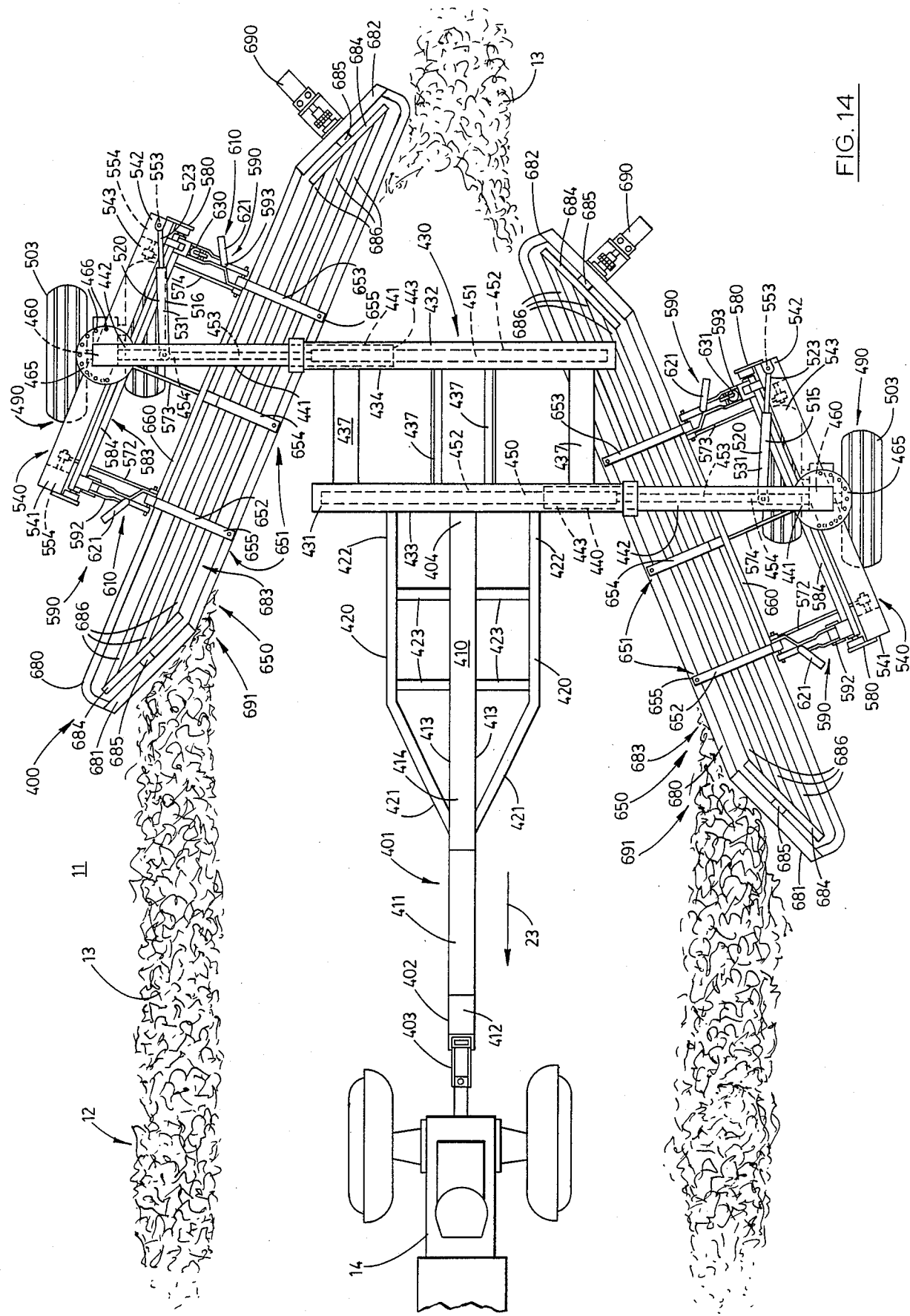
FIG. 14 is a second top plan view of the second embodiment of the subject invention and showing the work implements in a first operative configuration.

As can best be seen by reference to FIGS. 13 and 14, a towing assembly, which is generally indicated by the numeral 30, has a centrally disposed tubular beam 401 that has a first end 402. Mounted on the first end of the beam 401 is a hitch member 403 of conventional design and which is adapted releasably to be mounted on the rearward portion of the tractor 14 in a manner well understood by those skilled in the art. The beam further has a second or distal end 404.

The central tubular beam 401 has several discrete sections. More particularly, the beam 401 has a horizontal section 410, a sloped section 411 and a front section 412. The sections of the beam are welded together in an angulated configuration which is best illustrated by reference to FIG. 13 wherein the sloped section 411 extends diagonally downwardly from the horizontal section to the front section. Further, the beam 401 has opposite sides 413, a top side 414, and a lower side 415.

As can best be seen by reference to FIG. 13, a pair of channel members 420 are individually mounted, as by welding, on the opposite side 413 of the beam 401. The pair of channel members each have a first end 421 which is mounted on the beam 401 and an opposite second end 422 which is mounted as by welding to the main frame, which will hereinafter be discussed in greater detail. A plurality of transversely disposed brace members 423 are affixed on, and interconnect the horizontal section 410, and the individual channel members 420, on the opposite sides thereof. The second ends 422 of each of the channel members 420 are individually mounted to a main frame which is generally indicated by the numeral 430. The main frame 430 has a first and second tubular beam 431 and 432, respectively. The main frame further has a forward portion 433 and an opposite rearwardly disposed portion 434. Each of the tubular beams 431 and 432, respectively, has a mouth portion 435 and an opposite end portion 436. The respective mouth portions of the first and second tubular beams face in opposite directions laterally of the apparatus as best shown in FIG. 13. The first and second tubular beams are preferably of the square-section type and are interconnected by a plurality of longitudinally disposed beams 437 extending therebetween in spaced substantially parallel relation.

The main frame 430 slidably mounts third and fourth tubular beams which are generally indicated by the numerals 440 and 441, respectively. The third and fourth tubular beams are individually received in telescoping relation internally of the first and second tubular beam 431 and 432, respectively, and further are manufactured from the same or substantially similar shaped stock. The third and fourth tubular beams also have individual first ends 432 and opposite second ends 433, respectively. As best understood by a study of FIG. 14, first and second hydraulic cylinders, which are generally indicated by the numerals 450 and 451, respectively, are individually mounted internally of the first and second tubular beams and are operable, upon expansion and contraction, coaxially to extend or retract the third and fourth tubular beams 440 and 441, respectively. The first and second hydraulic cylinders each have a cylinder portion 452 which is operable to be mounted on the end portion 436 of the first and second tubular beams, respectively. Further, each of the hydraulic cylinders 450 and 451 has a ram or extendable portion 453 which has a distal end portion 454. As can best be seen by reference to FIG. 14, the distal ends 454 of the first and second hydraulic cylinders 450 and 451, respectively, are mounted on the second end 443 of the third and fourth tubular beams, respectively. It should be apparent, therefore, that the extension of the individual ram portions has the effect of extending or retracting the third and fourth tubular beams laterally of the main frame. This is best illustrated by reference to FIGS. 14 and 15, respectively.

Mounted to the second end 443 of the third and fourth tubular beams 440 and 441, respectively is a support member 460 which is disposed in a substantially normal attitude thereto, and which further has a proximal end 461 affixed to the individual tubular beams, and a distal end 462. The individual support members 460 are essentially square in their cross-sectional shape and further define a channel 463. As best seen by reference to FIGS. 17 and 18, the distal end 462 of each of the support members has two pairs of substantially coaxially aligned orifices 464 formed in predetermined transversely disposed attitudes therein. A substantially circular plate which is generally indicated by the numeral 465 is individually affixed, by utilizing welding, to the distal ends 462 of each of the support members. As best seen by reference to FIG. 17, the plates each have a plurality of orifices 466 of predetermined dimension formed in locations closely adjacent to the peripheral dimension thereof and a single large opening 467 is formed substantially centrally of each of the plates.

A pivot, or axle, 480 is mounted to each of the support members 460. The individual pivots 480 are substantially circular in their cross-sectional dimension and have a first end 481 which is affixed to the distal end 462 of each of the support members, and a second end 482. Two pairs of substantially transversely disposed channels 483 are individually formed in the first and second ends 481 and 482 of each of the pivots. The channels are individually disposed in substantially right-angular attitudes one to the other and are further disposed in positions such that they are rendered capable of being positioned in substantially coaxial alignment with the coaxially aligned orifices 464. A pair of bolts, which are individually indicated by the numerals 484, are individually operable to be received in the channels and in the orifices so aligned, and a nut 485 is received in screwthreadable receipt on each of the bolts thereby securing the individual pivots in substantially coaxial alignment with the individual support members 460.

A pair of earth engaging wheel assemblies, which are generally indicated by the numeral 490, are individually mounted on the central or main frame 430 and thus permit the main frame to move across the surface of the earth 11. The individual wheel assemblies 490 each have a vertically disposed support member 491 that has a first end 492, and an opposed second end 493. As best illustrated by reference to FIG. 18, a channel 494 is defined by each of the support members 491 and a pair of substantially coaxially aligned orifices 495 are formed in close proximity to the first end 492. As best understood by a study of FIG. 18, the second ends 482 of each of the pivots 480 are received in the channel 494 and secured therein by the bolts and corresponding nuts 484 and 485 which are individually received through the coaxially aligned orifices 495 and in the channels 483. This of course secures each of the earth engaging wheel assemblies 490 to the individual support members 460. Mounted to the second end 493 of each of the support members 491 is a pair of axle members 500. The axle members include a first axle 501 and a second axle 502. Rotatably mounted on the first and second axle members are earth engaging wheels 503 of conventional design. A substantially circular shaped and horizontally disposed plate 504 is mounted on the first end 492 of each of the support members 491. The plate has a centrally disposed orifice, not shown, which permits the individual pivots to extend therethrough.

A pair of support brackets, which are generally indicated by the numeral 510, are individually mounted to the distal end 462 of each of the support members 460. Each support bracket has a substantially U-shaped member 511 which includes a pair of spaced, substantially parallel arms 512. Each of the support brackets 510 further has a pair of angulated reinforcement members 513 which are individually secured at one end to the individual support members by the bolts 484 and are secured at the opposite end to the U-shaped member 511 by utilizing welding. A pair of substantially coaxially aligned orifices 514 are individually formed in each of the arms 512. As best seen by reference to FIGS. 13 and 17, respectively, third and fourth hydraulic cylinders 515 and 516, respectively, are releasably mounted to each of the support brackets and have individual cylinder portions 520. Each cylinder portion has an orifice 521 formed in its distal end, and an appropriately dimensioned pin or other fastening device 522 is operable to be received in the orifices 514 and 521, respectively, thereby securing the individual cylinder portion 520 to each of the support brackets. Each hydraulic cylinder 515 and 516 has an extendable portion or ram 523 which is, of course, selectively extendable and retractable. The ram has a distal end 524 which further has an orifice 525 formed therein. A pin or other fastening device 526 is received in the orifice 525 and is thereby operable to attach each of the rams to an individual receiving bracket which will hereinafter be discussed in greater detail. Each cylinder portion mounts a pair of appropriately dimensioned hydraulic fluid ports 530 which individually permit fluid communication of the individual cylinder portions with the hydraulic system of the apparatus 400. The hydraulic system of the apparatus will also be discussed in greater detail hereinafter. The hydraulic cylinders 515 and 516 are operable to be mounted in a first position 531 where they are disposed in rearwardly facing relation relative to the main frame 430 and a second position 532, where they are alternatively disposed in forwardly facing relation relative to the main frame. This is best seen by reference to FIGS. 14 and 15, respectively.

A pair of support beams, which are generally indicated by the numeral 540, are rotatably mounted on the individual pivots 480 and are thereby rendered operable for selective positioning relative to the path of travel 23. Each of the support beams 540 has individual first and second ends 541 and 542, respectively, and has top and bottom surfaces 543 and 544, respectively. Further, each of the support beams has a longitudinal axis generally indicated by the line labeled 545. As best seen by reference to FIGS. 16 and 18, respectively, a pair of pivot plates, which are generally indicated by the numeral 550, are individually mounted on the top and bottom surfaces 543 and 544 and are disposed in facing engagement with the individual plates 465. Each of the pivot plates has a substantially centrally disposed channel 551 formed therein. Further a plurality of orifices 556 are formed in close proximity to the peripheral edge of each of the pivot plates. The orifices 556 are disposed in predetermined positions such that they may periodically be aligned with the individual orifices 466 which are formed in close proximity to the peripheral edges of each of the plates 465. When these orifices are so aligned, bolts not shown, may be inserted therein thus fixing the individual support beams in a predetermined attitude relative to the path of travel 23.

Figure 16:
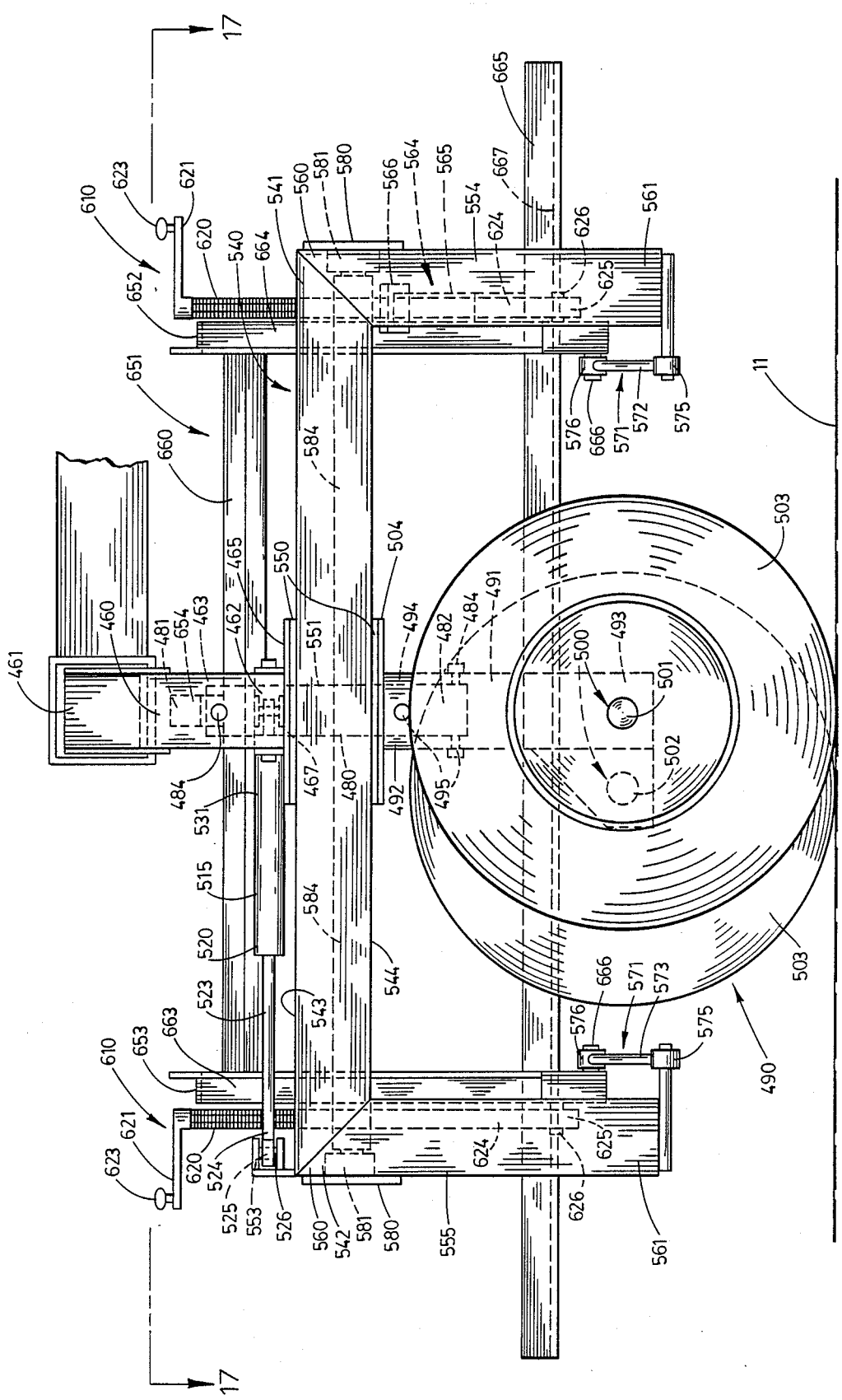
FIG. 16 is a fragmentary, side elevation of the second embodiment of the subject invention taken from a position along line 16—16 of FIG. 13.

As best seen by reference to FIG. 16, a pair of support or receiving brackets 552 are individually mounted on the top surface 543 of each of the support beams 540, the individual receiving brackets having an orifice 553 formed therein which is adapted to receive the distal end 524 of each of the rams 523. A pin 526 is adapted to mount the distal end of the ram 524 in the receiving bracket. This is best seen by reference to FIG. 17. As best illustrated by reference to FIG. 13, and when the extendable portions of the third and fourth hydraulic cylinders 515 and 516, respectively, are substantially fully extended, the individual extendable portions are operable to position the respective support beams 540 in substantially parallel relation to the direction of travel 23 and upon contraction, the third and fourth hydraulic cylinders are operable to cause the first end of each of the support beams to move into selected attitudes, right-angularly related to the path of travel 23. Mounted on each of the support beams 540 at the first and second ends thereof and depending downwardly therefrom at a substantially normal attitude are first and second vertical support beams which are individually indicated by the numerals 554 and 555, respectively. Each support beam 554 and 555 has a proximal end 560, which is mounted on the individual support beam and has an opposite or distal end 561. Further, each support beam 555 and 556 has an inside surface 563. Mounted to the inside surface 563 of the first vertical support beam 554 is a carriage stop which is generally indicated by the numeral 564. The carriage stop has a post 565 which is affixed, as by welding, to the inside surface 563, and a plate 566 is mounted thereon and is operable to limit the movement of the carriage in a manner which will hereinafter be discussed in greater detail.

A pair of posts, which are generally indicated by the numeral 570, are individually mounted to the distal end 561 of the first and second vertical support beams 554 and 555, respectively. As best seen by reference to FIG. 16, the individual posts are disposed in a substantially horizontal attitude and are individually operable rotatably to mount individual linking arms which are generally indicated by the numeral 571. A first linking arm 572 is rotatably mounted on the first vertical support beam 554 and connects the first vertical support beam with a rotary rake which will hereinafter be discussed in greater detail. A second linking arm 573 also connects the rotary rake with the second vertical support beam 555. A third linking arm 574 connects the individual support beams 540 with the rotary rake. Each of the linking arms 571 has a first end 575 and an opposed second end 576. Further, an attachment bracket 577 is mounted to the individual support beams 540 and is operable to receive the first end 575 of the third linking arm 574. This is best illustrated by reference to FIGS. 17 and 18, respectively. As best illustrated by reference to FIGS. 16, 17 and 18, a pair of mounting brackets 580 are individually mounted on the proximal end 560 of the first and second vertical support beams 554 and 555, respectively. The mounting brackets, which are positioned in inwardly facing relation relative to the main frame 430, are individually adapted to mount bearings 581 of conventional design. The bearings 581 have a channel 582 formed therein. Each of the mounting brackets 580 is individually operable to mount, for rotational movement, a carriage which is generally indicated by the numeral 583. The carriage includes a shaft 584 which is rotatably mounted in the bearing 581. Further, the shaft mounts axle members 585 which are individually mounted on the opposite ends thereof and are individually received in the channels 582 that are defined by the bearings 581. This is best illustrated bY reference to FIG. 17.

Figure 17:
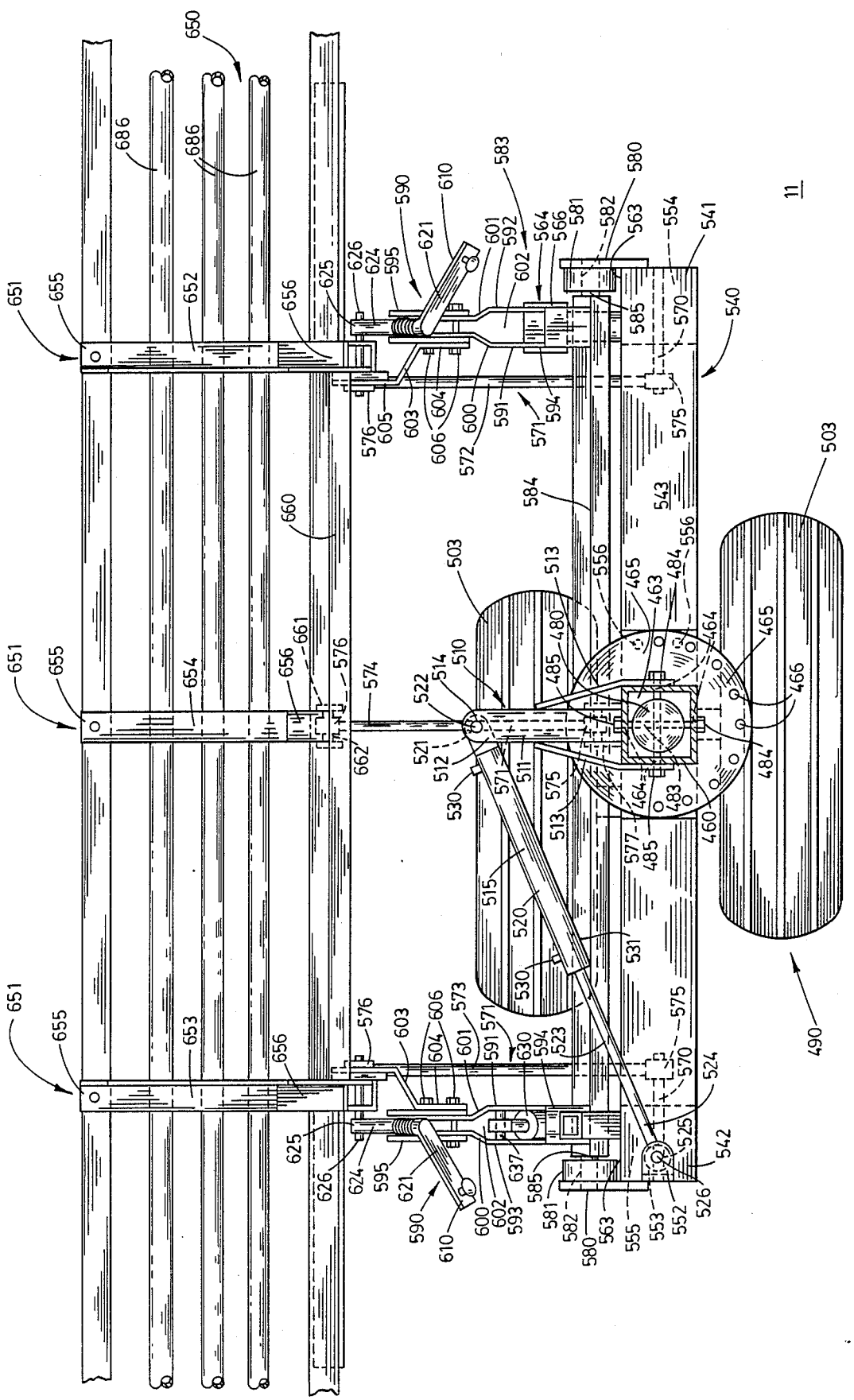
FIG. 17 is a fragmentary, plan view of the second embodiment of the subject invention taken from a position along line 17—17 of FIG. 16.

The carriage 583 further includes a pair of adjustment assemblies 590 which are individually mounted on the opposite ends of the shaft 584 in a manner which is best illustrated by reference to FIGS. 17 and 18, respectively. Each adjustment assembly has a pair of arm members generally indicated by the numeral 591. The individual arm members include a first arm member 592 and a second arm member 593. Each of the arm members has a proximal end 594 which is mounted, as by welding, to the shaft 584 and a distal end 595. The first and second arm 592 and 593, respectively, each have first and second portions 600 and 601, respectively, which are of angulated configuration. The first and second portions define a space 602 therebetween. Individual mounting brackets 603 which are also of angulated configuration individually connect the distal end 595 of each of the arms 592 and 593, respectively, to the rotary hay rake, which will hereinafter be discussed in greater detail. The individual mounting brackets have a first end 604 which is affixed to the distal end of each of the arms, and has a second end 605 which is mounted to the rotary hay rake. A pair of bolts 606 are adapted to mount the first end 604 to the distal end of each of the arms.

An orientation assembly, which is generally indicated by the numeral 610, is individually mounted on the first and second arms 592 and 593, respectively. The orientation assembly includes a shaft guide 611 which is mounted to the distal end 595 of each of the arms by utilizing conventional fasteners. The shaft guide further has a channel, not shown, which is disposed substantially centrally thereof. Each shaft guide has an upwardly facing edge 612; and an elongated shaft, which is generally indicated by the numeral 613, is rotatably mounted in the shaft guide and is operable to be rotated about its respective longitudinal axis. The elongated shaft has a first end 614 and a remote, externally screw-threaded second end 615. A compression spring 620 is received about the elongated shaft in rested engagement on the upwardly facing edge 612 of the shaft guide 611. A crank 621 is mounted on the first end of the elongated shaft and the crank has a downwardly facing edge 622 concentric to the elongated shaft and engaging the compression spring. The crank mounts a handle 623. The screw-threaded second end 615 of the elongated shaft is screw-threadably received in a receiving cylinder 624 of conventional design. The receiving cylinder has a screw-threaded substantially axially disposed central passageway, not shown, which is operable matingly to receive the second end of the elongated shaft. The receiving cylinder further has a distal end 625 which is pivotally mounted on the rotary hay rake by a short shaft which is generally indicated by the numeral 626. The rotary hay rake will hereinafter be discussed in greater detail. Thus, it will be seen that upon rotational movement of the crank handle, the screw-threaded second end of the shaft is adjusted inwardly or outwardly by the crank thereby causing the rotary hay rake to be ever so slightly rotated. This permits the rotary hay rake to be adjusted relative to the surface of the earth to perform specific raking operations.

Fifth and sixth hydraulic cylinders, hereinafter referred to as the lift cylinders, are generally indicated by the numerals 630 and 631, respectively. The lift cylinders are of conventional design and have individual cylinder portions 632. Each cylinder portion further has a distal end 633 which is individually mounted on each of the second vertical support beams 555. The distal end each of the cylinder portions is mounted on each of the second vertical support members 555 by a mounting bracket 634. Further, each of the lift cylinders has a ram 635 of conventional design. The rams each have a distal end 636 which is individually pivotally mounted to the second arms 593. The distal end of the individual rams is received in the space 602 and is secured between the first and second portions 600 and 601 by a suitably dimensioned post or pin 637 which is secured to the individual portions by welding or the like. This is best illustrated by reference to FIG. 17. The individual lift cylinders further have hydraulic ports 638 which are connected in fluid communication with the hydraulic system of the apparatus 400 which will hereinafter be discussed in greater detail. The individual lift cylinders are operable upon extension and contraction selectively to position the rotary hay rake along a third path of travel, which is generally indicated by the line labeled 640. The third path of travel is defined between a first or uppermost position 641 and a second or lowermost position 642. This is best seen by reference to FIG. 18.

A work implement depicted in the illustrative environment of the second form of the invention 400 is a rotary hay rake 650. The rotary hay rake is supported or otherwise mounted on the plurality of linking arms 571 by a subframe, which is generally indicated by the numeral 651. The subframe 651 includes first, second, and third frame members 652, 653, and 654, respectively, the aforementioned frame members disposed in predetermined fixed substantially parallel spaced relation one to the others. Further, each of the frame members 652, 653 and 654 has a first end 655 and an opposed second end 656. This is best illustrated by reference to FIG. 17. Mounted to the second ends 656 of each of the frame members is a substantially horizontally disposed fourth frame member 660. Mounted on the fourth frame member and disposed in substantially coaxial alignment with the third frame member 654 is a mounting bracket 661. The mounting bracket is adapted to receive the second end 576 of the third linking arm 574. The mounting bracket further is operable to receive the pin 662 which permits the second 576 to be secured in pivotal relation therewith. Fifth and sixth frame members, which are generally indicated by the numerals 663 and 664, respectively, are disposed in a substantially vertical attitude and depend downwardly at substantially normal attitudes with respect to the second ends 656 of the first and second frame members, respectively. A seventh frame member, which is generally indicated by the numeral 665 is mounted as by welding to the fifth and sixth frame members as best seen by reference to FIG. 16. Individually mounted to the distal ends of the fifth and sixth frame members, respectively, is a pair of short posts or shafts 666 which are individually adapted to receive the second ends 576 of the first and second linking arms 572 and 573, respectively. This is best seen by reference to FIG. 16. The seventh frame member 665 has a supporting surface 667 upon which the work implement rests.

Each rotary hay rake 650 has an implement frame 680 which is mounted to the subframe 651 by a plurality of bolt and nut assemblies, not shown, but which extend through the subframe and engage the implement frame 680. The implement frame has a front end portion 681 and an opposite, rear end portion 682 with respect to the intended direction of travel. A raking reel of conventional construction 683 is mounted for rotational movement in a conventional manner on and within the implement frame. The raking reel has a pair of star wheels 684, both of which are mounted on the implement frame by individual rotary mounts 685. The star wheels of each raking reel are interconnected by a plurality of tine bars 686 that mount a plurality of raking tines, not shown, for operation in the conventional fashion. A hydraulic motor 690 is secured on the rear end portion 682 of the implement frame 680 and is disposed in alignment with the rearwardly positioned rotary mount 685. The hydraulic motor is mounted thereto and is connected in driving relation to the rear rotary mount by a drive linkage, not shown.

Figure 15:
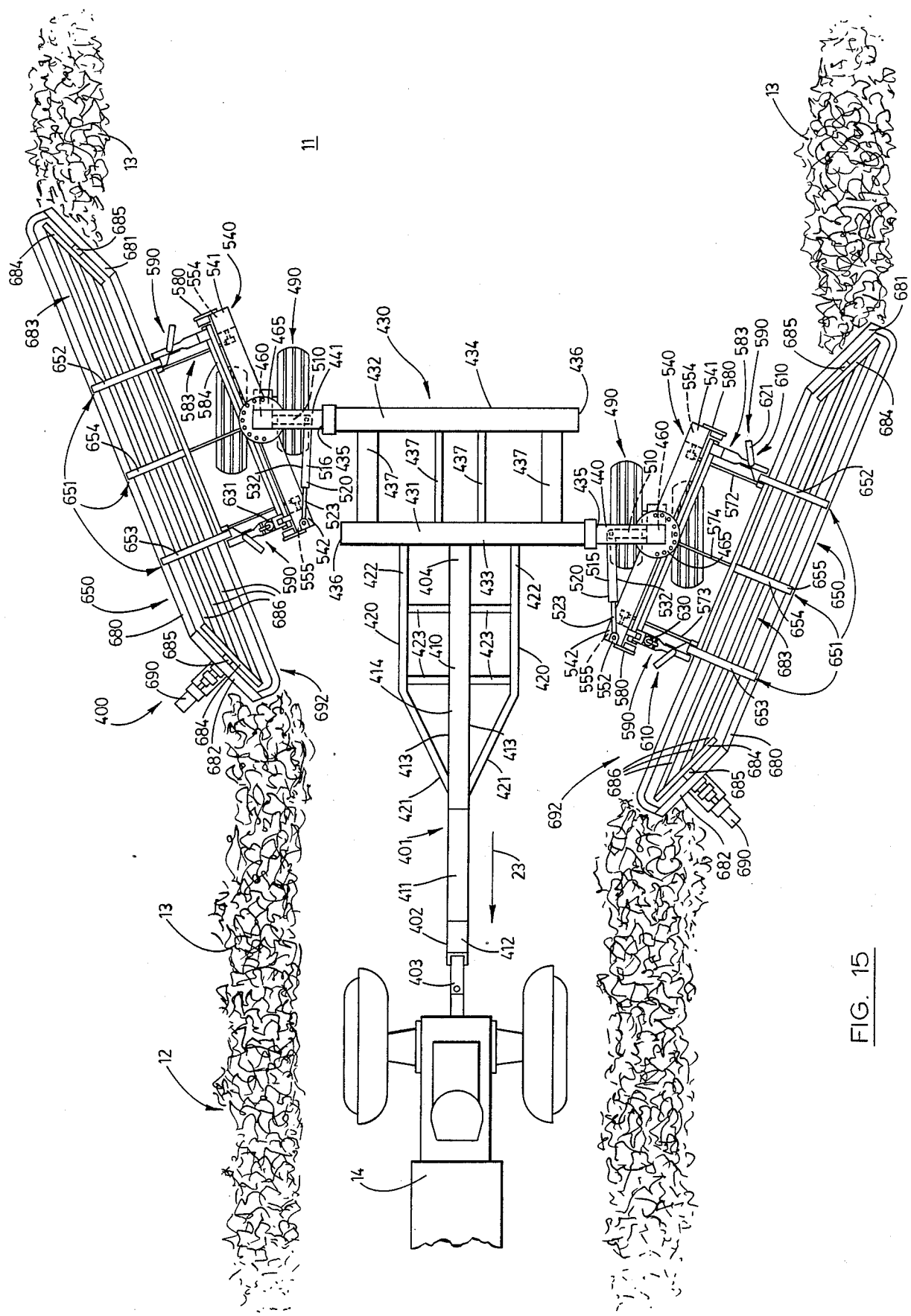
FIG. 15 is a third top plan view of the second embodiment of the subject invention and showing the work implements in a second operative configuration.

As best illustrated by a comparison of FIGS. 14 and 15, the apparatus 400 of the subject invention is operable to position the individual rotary hay rakes 650 in a first position 691 and in an opposite, second position 692 with respect to the path of travel 23. As best seen by reference to FIG. 14, the individual rotary hay rakes are disposed with the front end portions 681 disposed in forwardly facing relation relative to the direction of movement. The individual rotary hay rakes are operable when disposed in this position, to rake a selected crop in a direction which is generally towards the path of travel 23. Further, and if the operator desires to rake the crop in a direction generally away from the path of travel, then in that instance the apparatus 400 will be configured in the fashion shown in FIG. 15. As should be understood the individual rotary hay rakes have been disconnected and then mounted on the opposite sides of the main frame 430. In this fashion, the apparatus is adapted to rake the crop in a direction away from the path of travel 23.

Figure 19:
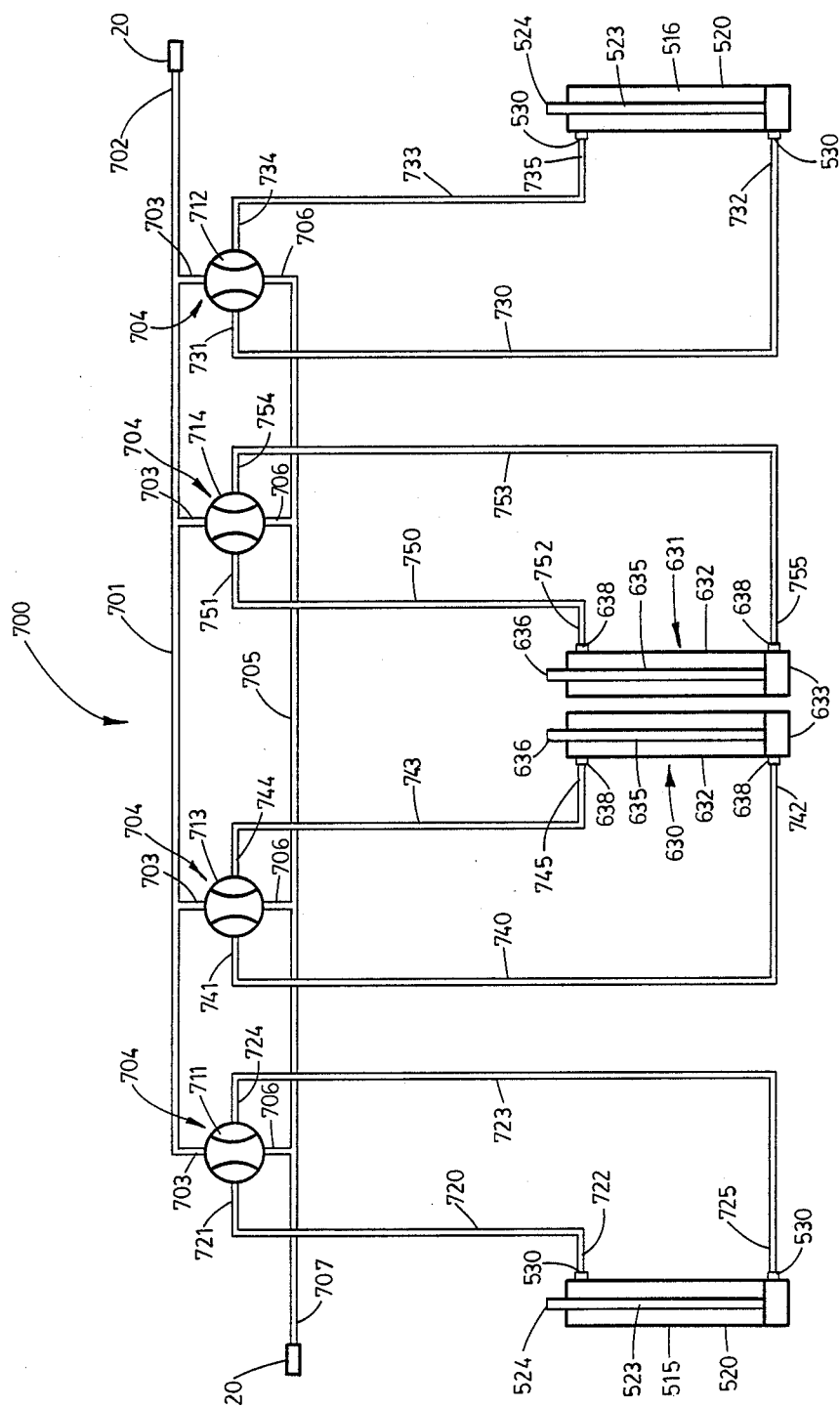
FIG. 19 is a schematic diagram of the hydraulic system of the second embodiment of the subject invention.

The hydraulic system of the second form of the apparatus 400 is generally indicated by the numeral 700 and is shown most clearly in the schematic diagram of FIG. 19. It will be readily apparent after a study of this schematic diagram, that a variety of hydraulic systems can be employed for operating the apparatus 400 and therefore the hydraulic system 700 is intended as a representative example of only one of such arrangements. However, the hydraulic system 700 is uniquely well suited to the apparatus 400 and will hereinafter be discussed in greater detail. The hydraulic system has a first hydraulic conduit 701 which is mounted in fluid communication with the hydraulic system of the tractor 14, not shown. As earlier discussed the tractor 14 mounts a pair of hydraulic couplings 20 which are individually connected in fluid communication with the hydraulic system 700. The first hydraulic conduit 701 has an intake end 702 which is mounted in fluid communication with one of the couplings 20 of the tractor 14. The first hydraulic conduit further has a plurality of exhaust or second ends 703 which are individually connected in fluid communication with a plurality of hydraulic valves which are generally indicated by the numeral 704. A second hydraulic conduit 705 is mounted in fluid communication with the plurality of hydraulic valves 704. The second hydraulic conduit has a plurality of first or intake ends 706 and has an exhaust end 707 which is mounted in fluid communication with one of the couplings 20 that is mounted on the tractor 14. The plurality of hydraulic valves includes first, second, third and fourth hydraulic valves, which are individually indicated by the numerals 711, 712, 713, and 714, respectively. The individual hydraulic valves are of conventional design and therefore for the sake of brevity are not discussed in significant detail herein.

A third hydraulic conduit 720 connects the first hydraulic valve 711 and the third hydraulic cylinder 515 in fluid communication. The third hydraulic conduit has a first end 721 which is mounted in fluid communication with the first hydraulic valve and a second end 722 which is mounted in fluid communication with the third hydraulic cylinder. Further, a fourth hydraulic conduit, which is generally indicated by the numeral 723, connects the first hydraulic valve in fluid communication with the third hydraulic cylinder 515. The fourth hydraulic conduit has a first end 724 which is mounted in fluid communication with the first hydraulic valve and an opposite second end 725 which is mounted in fluid communication with the third hydraulic cylinder 515. A fifth hydraulic conduit 730 connects the second hydraulic valve 712 in fluid communication with the fourth hydraulic cylinder 560. The fifth hydraulic conduit has a first end 731 which is mounted in fluid communication with the second hydraulic valve 712 and an opposite second end 732 which is mounted in fluid communication with the fourth hydraulic cylinder 516. A sixth hydraulic conduit, which is generally indicated by the numeral 733, connects, in fluid communication, the second hydraulic valve 712 with the fourth hydraulic cylinder 516. The sixth hydraulic conduit has a first end 734 which is mounted in fluid communication with the second hydraulic valve 712, and an opposite second end 735 which is mounted in fluid communication with the fourth hydraulic cylinder 516.

A seventh hydraulic conduit 740 connects the third hydraulic valve 713 in fluid communication with the fifth hydraulic cylinder 630. The seventh hydraulic conduit has a first end 741 which is disposed in fluid communication with the third hydraulic valve and an opposite second end 742 which is mounted in fluid communication with the fifth hydraulic cylinder. Further, an eighth hydraulic conduit, which is generally indicated by the numeral 743, is mounted in fluid communication with the third hydraulic valve 713 and the fifth hydraulic cylinder 630. The eighth hydraulic conduit has a first end 744 which is mounted in fluid communication with the third hydraulic valve 713 and an opposite second end 745 which is mounted in fluid communication with the fifth hydraulic cylinder. A ninth hydraulic conduit, which is generally indicated by the numeral 750 is disposed in fluid communication with the fourth hydraulic valve 714 and with the sixth hydraulic cylinder 631. The ninth hydraulic conduit has a first end 751 which is mounted in fluid communication with the fourth hydraulic valve and an opposite second end 752 which is mounted in fluid communication with the sixth hydraulic cylinder. A tenth hydraulic conduit 753 is mounted in fluid communication with the fourth hydraulic valve 714, and with the sixth hydraulic cylinder 631. The tenth hydraulic conduit has a first end 754, which is disposed in fluid communication with the fourth hydraulic valve, and further has an opposite or second end 755 which is mounted in fluid communication with the sixth hydraulic cylinder.

As best understood by a study of FIG. 19, selective operation of the individual hydraulic valves 711, 712, 713, and 714 permits the individual hydraulic cylinders 515, 516, 630 and 631, respectively, to position the rotary hay rake 650 in various attitudes with respect to the path of travel 23 and with respect to the third path of travel 640 thereby permitting the apparatus 400 to perform various raking operations with a high degree of efficiency.

OPERATION

First Form

The operation of the first form of the subject invention is believed to be readily apparent and is briefly summarized at this point.

The hitch member 33 of the apparatus 10 is connected to the tractor 14 in trailing relation, and with the apparatus 10 adjusted to the configuration shown in FIG. 1, the apparatus can be towed along road ways, paths, and the like, without substantial difficulty. In order to interconnect the apparatus and the tractor for operating the various systems of the apparatus, the individual couplings 20 and the hydraulic system 240 are connected in fluid communication in the fashion shown in FIG. 11. Similarly, the pneumatic system 320 is connected in fluid communication with the compressor 15, the compressor supplying a source of compressed air which is operable to power the plurality of air cylinders 215. This is best seen by reference to FIG. 12.

To adjust the apparatus 10 to the configuration shown in FIG. 1 wherein the pair of support beams 80 are individually disposed in predetermined substantially parallel relation one to the other and suitable for travel along roadways, the operator would adjust, in an appropriate fashion, the several hydraulic control valves, which are generally indicated by the numeral 250 thereby causing the first and second hydraulic cylinders 80 and 81, respectively, to assume a retracted position and further causing the rams 143 of the third and fourth hydraulic cylinders 135 and 136 to be disposed in fully extended positions. In order to accomplish this, the operator would adjust the third and fourth hydraulic valves 253 and 254 in such a fashion so as to permit hydraulic pressure to enter from the first hydraulic conduit 241 and pass into the seventh and ninth hydraulic conduits 283 and 293, respectively. Upon entering into the respective hydraulic cylinders 80 and 81, the hydraulic pressure would have the effect of urging the rams or individual extendable portions 84 into a retracted position. The movement of the rams into the retracted position has the effect of causing the third and fourth tubular beams 71 and 72, respectively, to be urged into substantially telescoping internal receipt inside of the first and second tubular beams 63 and 64, respectively. This is shown most clearly by reference to FIG. 1. Further, the operator would adjust the first and second hydraulic valves 251 and 252, respectively, to permit hydraulic pressure to enter from the first hydraulic conduit 241 and be received into the fourth hydraulic conduit 270 and the sixth hydraulic conduit 280 respectively. Upon being received in the individual cylinder portions 140, the hydraulic pressure would have the effect of urging the individual rams or extendable portions 143 into the fully extended position thereby having the effect of positioning the individual support beams 180 in substantially parallel relation to the path of travel. This is seen most clearly by reference to FIG. 1.

The individual hay rakes 210 are positioned in predetermined, elevated, spaced relation to the surface of the earth 11 for earth traversing movement. To accomplish this, the operator, not shown, would adjust the three-way valve 330 in such a fashion so as to release a source of compressed air stored in the reservoir 324 and allow it to pass into the third pneumatic conduit 332. Upon being received in the third pneumatic conduit, a pressure gradient would be established whereby the shuttle valve 335 would assume a blocking or fluid impeding position relative to the second end 352 of the fifth pneumatic conduit 350. After assuming this fluid impeding position, the air pressure would enter into the sixth pneumatic conduit 353 and be substantially evenly distributed to the plurality of air cylinders 215. Upon entering into the individual cylinder portions 221, the rams or extendable portions 225 would be urged into the extended positions, which are shown most clearly by reference to FIG. 9. Movement of the individual rams 225 into the extended positions has the effect of urging the individual hay rakes along the second path of travel 230 and into the uppermost position 232. This of course positions the hay rakes 210 in elevated spaced relation to the surface of the earth 11 for earth traversing movement.

Figure 4:
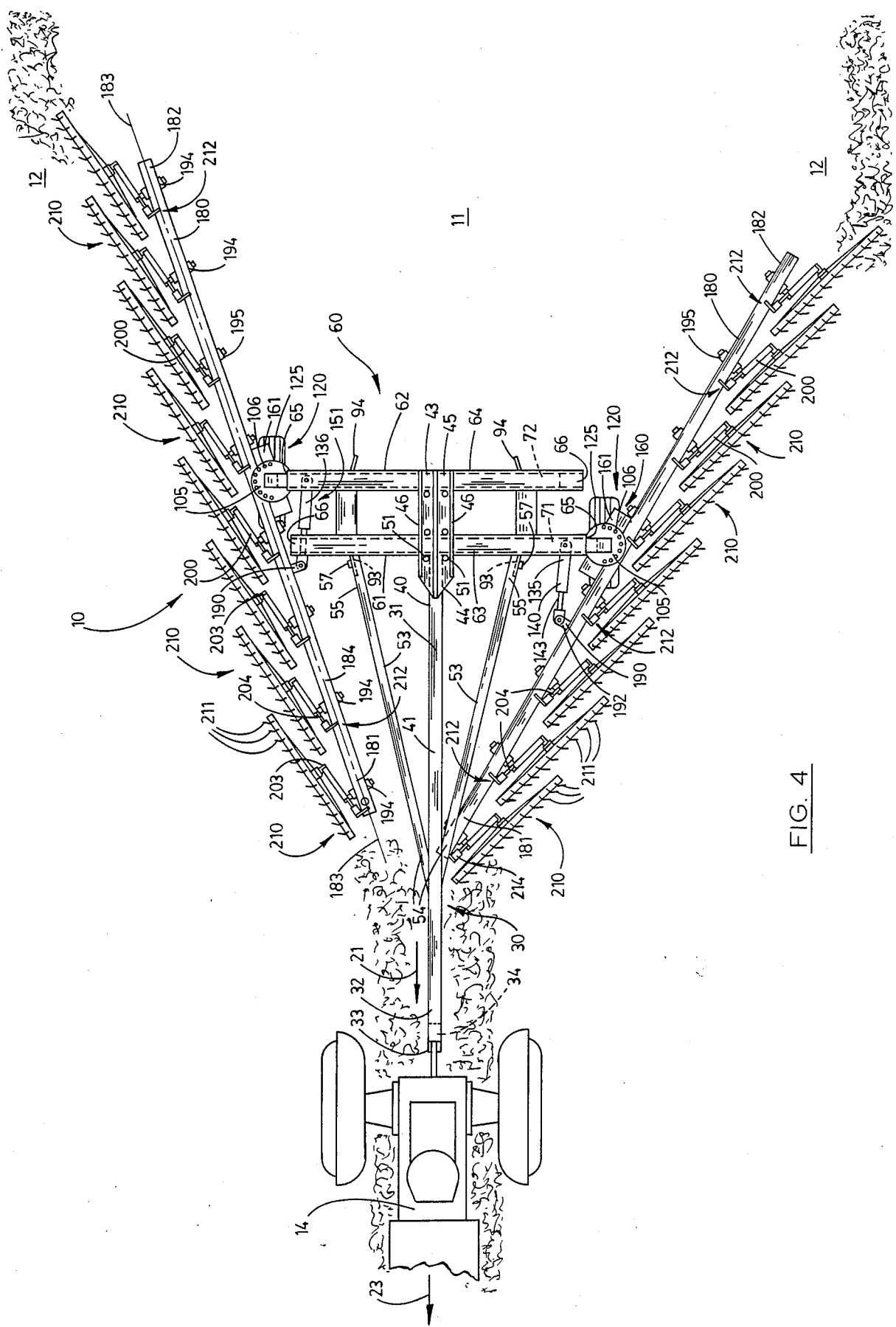
FIG. 4 is a second top plan view of the first embodiment of the subject invention and showing the work implements disposed in a first operative configuration.
Figure 5:
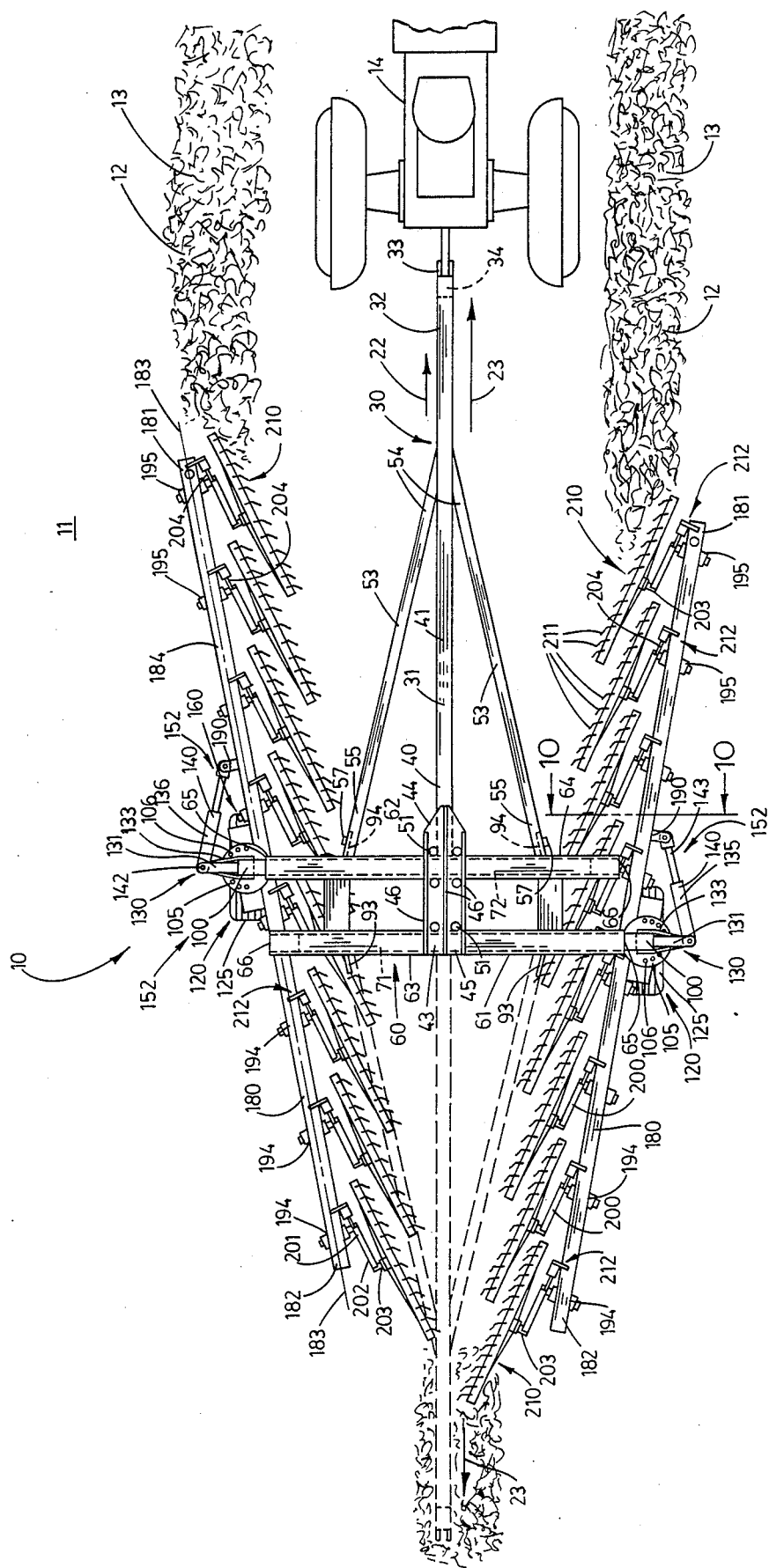
FIG. 5 is a third top plan view of the first embodiment of the subject invention and showing the work implements disposed in a second operative configuration.

The operation of the apparatus 10 for positioning the individual hay rakes 210 thereof can best be visualized by reference to FIGS. 1, 4 and 5. As earlier discussed, when the third and fourth hydraulic cylinders 80 and 81 are respectively caused to be moved into a retracted position, the third and fourth tubular beams 70 and 71 are slidably retracted within first and second tubular beams 63 and 64, respectively. Once the field where the raking operations are to be conducted has been reached, the apparatus 10 can be adjusted to any of the plurality of operative configurations specifically adapted for the work to be performed. For example, FIGS. 4 and 5 show two operative configurations designed to perform different work operations. However, it will be understood that virtually an infinitely number of relationships for the work implements can be created and those in FIGS. 4 and 5 are intended merely to be illustrative of such operative configurations.

As shown in FIGS. 4 and 5, the individual hay rakes 210 are mounted in substantially parallel relation relative to one another along the support beams 180. Each of the support beams are disposed in substantially offset relation relative to each other so that the second ends 182 thereof are similarly offset. This provides clearance for adjusting the individual hay rakes and the individual support beams relative to each other. Further, and in addition, this offset allows cooperative operation of the individual hay rakes such as can be visualized in FIG. 5 wherein the windrow is overturned against the hay rakes on the right so as to prevent tumbling of the windrow.

Adjustment of the apparatus 10, to any of the various configurations, is performed by using the hydraulic valve 250 and by regulating the three-way valve 330 and the regulator 340 in a manner similar to that already described. Thus, in order to adjust the apparatus 10 from the configuration shown in FIG. 1 to the configuration shown in FIG. 4, the operator would adjust the first and second hydraulic valves 251 and 252, respectively, in such a manner as would permit them individually to release hydraulic pressure from the first hydraulic conduit 241 and be received into the third and fifth hydraulic conduits 264 and 273, respectively. The hydraulic pressure upon being received in the cylinder portions 140 of the third and fourth hydraulic cylinders 135 and 136 has the effect of urging the extendable portions or rams 143 into a retracted position internally of the individual cylinder portions. Movement of the individual extendable portions 143 into the retracted position further has the effect of causing the support beams 180 to move into selective operative positions relative to the first path of travel 23. More particularly, the third and fourth hydraulic cylinders, upon retraction, individually have the effect of moving the first and second ends 181 and 182, respectively, into positions increasingly right-angularly related to the first direction of travel 21. Upon positioning the individual support beams in the appropriate attitude, the operator may, for example, desire further to secure the individual support beams relative to the first path of travel. To accomplish this, the operator would insert a bolt 174 or other similar device through the individual substantially coaxially aligned orifices 106 and 173, respectively, such that the plate 105 is secured in fixed relation relative to the housing 160. This is illustrated most clearly by reference to FIG. 7. Further it should be readily apparent that the apparatus 10 can be manufactured without the third and fourth hydraulic cylinders. However the support beams 180 would have to be adjusted by hand under these circumstances.

After securing the individual support beams 180 and thus the hay rakes 210 in predetermined positions relative to the first path of travel 23, the operator would then adjust the pneumatic system 320 in such a fashion so as to position the individual hay rake 210 along the second path of travel 230 intermediate the uppermost and lowermost positions 231 and 232, respectively. To accomplish this, the operator would adjust the three-way valve 330 in such a fashion so as to permit the release of air pressure stored in the reservoir 324. The three-way valve would be adjusted such that the air pressure would be released through the second pneumatic conduit 331 and be directed into the fourth pneumatic conduit 341. The regulator 340 would then be adjusted in such a fashion so as to permit the air pressure received in the fourth pneumatic conduit 341 to enter into the fifth pneumatic conduit 350. Air pressure received into the fifth pneumatic conduit 350 creates a pressure gradient which has the effect of urging the shuttle valve 335 into fluid impeding relation relative to the second end 334 of the third pneumatic conduit 332. In this position, the shuttle valve permits fluid communication between the fifth pneumatic conduit 350 and the sixth pneumatic conduit 353. The air pressure, under these circumstances passes into the individual air cylinders 215 and thereby positions the individual rams or extendable portions 225 into predetermined positions and thereby urges the individual wheel rakes along the second path of travel. As should be readily apparent, the operator can, by adjusting the regulator, move the individual hay rakes into the lowermost position along the second path of travel, the individual air cylinders exerting sufficient force on the shaft 204 substantially to counterbalance the effects of gravity acting on the individual hay rakes thereby positioning the hay rakes in operative relation relative to the surface of the earth to perform various raking operations. When the desired position has been reached, the operator simply returns the regulator to a neutral position thereby preventing further air pressure from being received by the individual air cylinders. The work implements are thereby retained in the positions already described in an operative position relative to the intended direction of travel and with respect to the surface of the earth.

Figure 2:
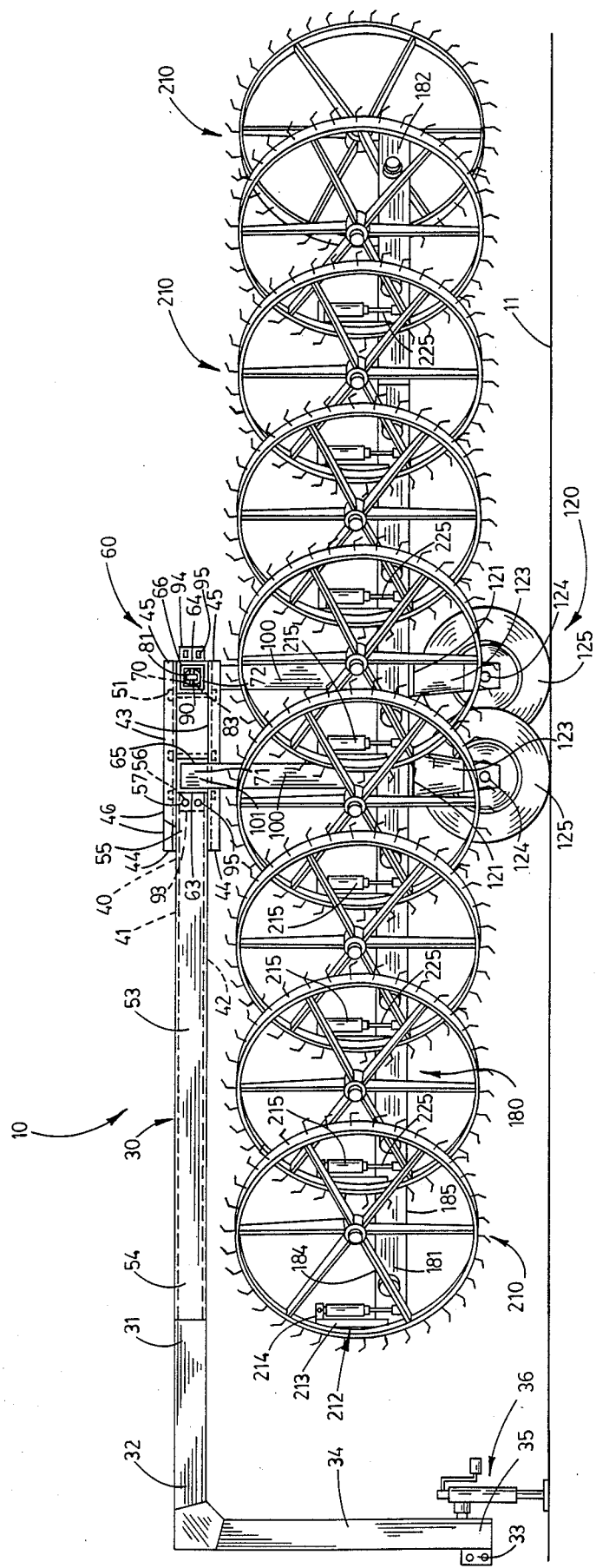
FIG. 2 is a side elevation of the first embodiment of the subject invention and showing the work implements disposed in elevated spaced relation to the surface of the earth.

Subsequently, the operator would mount the tractor 14 and tow the apparatus 10 along the surface of the earth 11 in the first direction 21 and along the path of travel 23. In this configuration the apparatus 10 is operable to rake the crop in a direction away from the path of travel 23. As best illustrated by reference to FIGS. 1 and 2, the towing assembly 30 is shown mounted on the forward portion 61 of the main frame 60. It should be understood, however, that the apparatus 10 is adapted to rake inwardly, that is, it is operable to move the windrow 13 in a direction towards the path of travel 23 and further is adapted to move in a second direction 22 along the path of travel.

Adjustment of the apparatus 10 to the configuration shown in FIG. 5 and which is adapted to rake the crop in a direction towards the path of travel 23, is accomplished by mounting the towing assembly 30 on the rearward portion 62 of the central or main frame 60. Further, the individual hay rakes 210 would be moved from the position shown in FIG. 4 wherein they are disposed in outwardly facing relation relative to the main frame and would thereafter be positioned in a second position which is shown most clearly by reference to FIG. 5. As shown therein the individual hay rakes 210 are disposed in inwardly facing relation relative to the main frame. This movement of the individual hay rakes into the inwardly disposed position will be discussed in more detail in the paragraph which follows.

Adjustment of the apparatus 10 to the configuration shown in FIG. 5 is accomplished in the following manner. The operator would release the towing assembly 30 from the forward portion 61 of the main frame 60 by removing the bolts 57 which secures the pair of sloped sections 53 to the first pair of towing brackets 93. Further, the operator would remove the bolts 51 which individually secure the mounting plates 43 to the central or main frame. The operator would then mount the towing assembly 30 on the rearward portion 62 of the main frame 60 by reversing the aforementioned steps. The operator would thereafter adjust the hydraulic system 240 in such a fashion so as to cause the third and fourth tubular beams to be extended laterally of the central or main frame in a manner which is best illustrated by reference to FIG. 3. The operator accomplishes this by adjusting the third and fourth hydraulic valves 253 and 254, respectively, in such a fashion so as to permit hydraulic pressure to be released from the first hydraulic conduit 241 and pass into the eighth hydraulic conduit 290 and the tenth hydraulic conduit 300, respectively. The hydraulic pressure, so delivered, enters into the first and second hydraulic cylinders 80 and 81 respectively and causes the individual rams or extendable portions 84 to extend therefrom. Movement of the individual rams 84, as earlier discussed, has the effect of causing the third and fourth tubular beams to be urged into a position laterally of the central or main frame 60.

After accomplishing the aforementioned act the operator would then disconnect the distal end 144 of the individual rams 143 from the attachment bracket 190. Further, the operator would remove the bolts 174 which secure the individual support beams in fixed relation relative to the path of travel 23. The support beams would then be rendered capable of pivotal movement about the individual pivots 110 such that these support beams could position the individual hay rakes 210 in the second or inwardly disposed position as shown in FIG. 5 wherein they are disposed in inwardly facing relation relative to the main frame 60. The operator would thereafter move the individual support brackets 130 from the first position 151 which is shown most clearly by reference to FIG. 8, and would thereafter individually mount them in the second position 152 wherein they would individually be disposed in outwardly facing relation relative to the main frame 60. Having accomplished the repositioning of the individual support brackets, the third and fourth hydraulic cylinders 135 and 136 and more particularly the distal ends of the extendable portions thereof would be connected to the individual attachment brackets in the manner which was heretofore discussed. The individual support beam 180 as well as the individual hay rake 210 would then be adjusted in an appropriate fashion.

Second Form

The operation of the second form 400 of the subject invention is believed to be clearly apparent and is briefly summarized at this point. With the hitch member 403 of the apparatus 400 connected to the tractor 14 in trailing relation, and with the apparatus adjusted to the configuration shown in FIG. 13, the apparatus 400 can be towed along road ways, paths and the like without significant difficulty. In order to connect the apparatus 400 and the tractor 14 for operating the apparatus, the couplings 20 of the tractor's hydraulic system are individually connected to the first and second hydraulic conduits 701 and 705, respectively. This is best illustrated by reference to FIG. 19. Similarly, the hydraulic motors 690 which are mounted on the implement frame 680 are connected in fluid communication to the hydraulic system of the tractor, not shown.

In order to adjust the apparatus 400 to the configuration shown in FIG. 13 wherein the work implements hereinafter referred to as rotary hay rakes 650 are disposed in side-by-side and substantially parallel relation, the operator, not shown, would adjust the first and second hydraulic valves 711 and 712, respectively, in such a fashion so as to cause the third and fourth hydraulic cylinders 515 and 516, and more particularly the individual rams or extendable portions 523 thereof to be located in extended positions. Further, the operator would adjust a pair of individual hydraulic valves, not shown, in such a fashion so as to release hydraulic pressure into the first and second hydraulic cylinders 450 and 451, respectively. The first and second hydraulic cylinders 450 and 451 operate in a fashion similar to the first and second hydraulic cylinders 80 and 81, respectively, of the first form of the apparatus 10, that is, hydraulic pressure released into the individual hydraulic cylinders has the effect of causing the rams or extendable portions 453 to be disposed in extended positions thereby urging the third and fourth tubular beams 440 and 441 laterally of the main frame 430. This is best seen by reference to FIG. 14. Conversely, the selective application of hydraulic pressure to the first and second hydraulic cylinders has the effect of urging the individual rams 453 to retract thereby causing the third and fourth tubular beams 440 and 441, respectively, to be telescopingly received internally of the first and second tubular beams 431 and 432, respectively.

Upon adjustment of the first and second hydraulic cylinders 450 and 451 into a fully retracted position, the apparatus 10 assumes the configuration shown in FIG. 13, that is, it is suitable for highway transportation. Prior to movement along the highway, the operator would adjust the third and fourth hydraulic valves 713 and 714, respectively, in such a fashion so as to cause the fifth and sixth hydraulic cylinders 630 and 631 to position the rotary hay rakes 650 in predetermined spaced relation to the surface of the earth 11. To accomplish this, the operator would adjust the third and fourth hydraulic valves 713 and 714 in such a fashion so as to release hydraulic pressure received in the first hydraulic conduit 701 into the seventh and tenth hydraulic conduits 740 and 753, respectively. The hydraulic pressure, upon being received in the cylinder portions 632 causes the rams or extendable portions 635 to be disposed in extended relation, the rams adapted to position the rotary hay rakes 650 in spaced relation to the surface of the earth. This is illustrated most clearly by reference to FIG. 18. Upon extension of the individual rams 635, the rotary hay rakes are moved along the third path of travel 640 and into the first FIG. 1.

Figure 18:
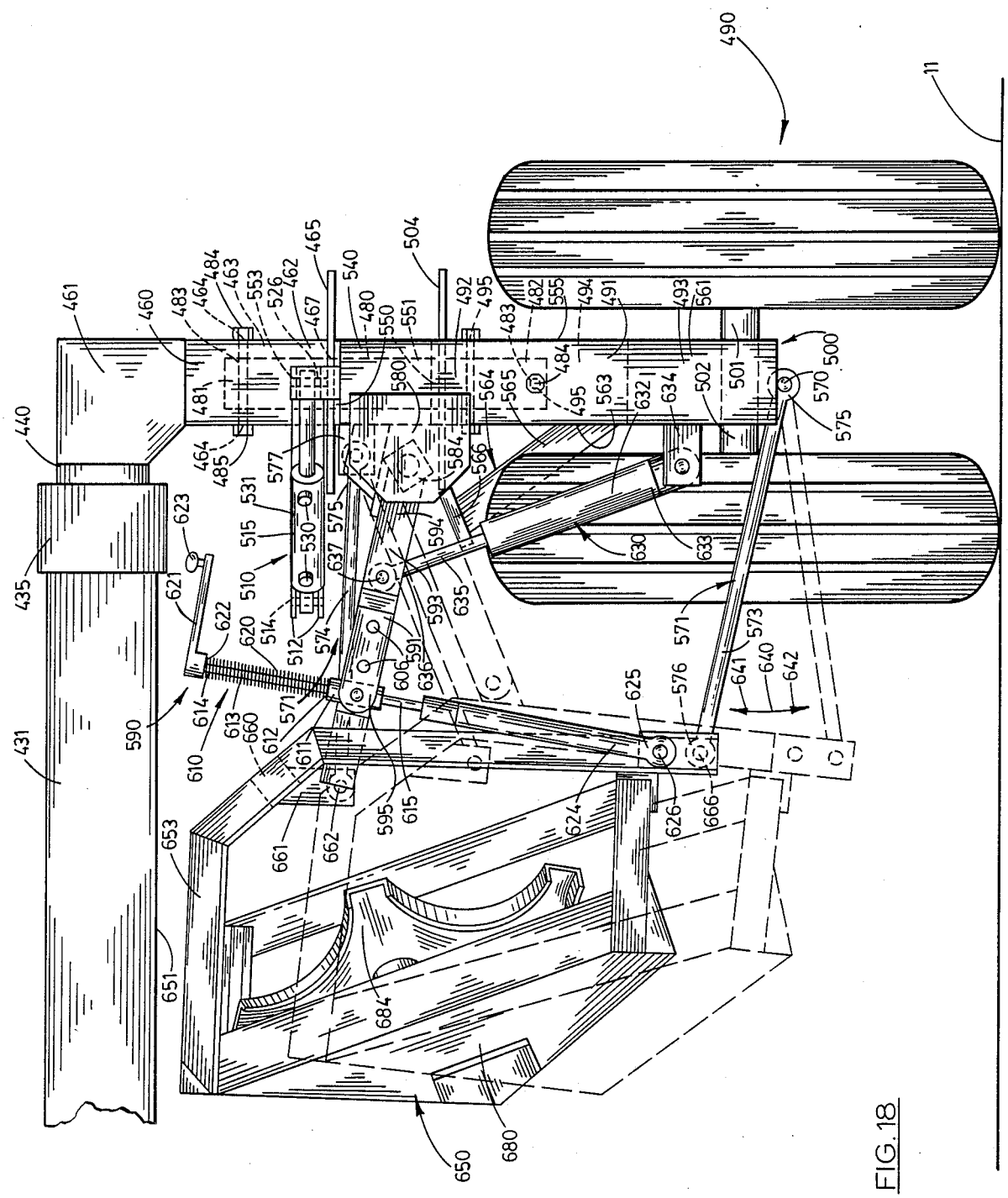
FIG. 18 is a fragmentary, side elevation of the second embodiment of the subject invention taken from a position along line 18—18 of FIG. 17.

The operation of the apparatus 400 in positioning each of the rotary hay rakes 650 in selective operative positions relative to the path of travel 23 can best be visualized in FIGS. 14, 15 and 18, respectively. As earlier discussed, the first and second hydraulic cylinders 450 and 451, respectively, are adapted to position the third and fourth tubular beams 440 and 441, respectively, laterally of the main frame 430 and in substantially coaxial alignment with the first and second tubular beams 431 and 432, respectively. Such outward movement of the third and fourth tubular beams has the effect of moving the earth engaging wheel assemblies as well as the rotary hay rakes 650 in a direction away from the main frame. Upon positioning the individual wheel assemblies in a proper attitude relative to the main frame, the operator would adjust the individual rotary hay rakes in predetermined selected positions relative to the path of travel 23. To accomplish this, the operator would adjust the first and second hydraulic valves 711 and 712 in an appropriate fashion such that the third and fourth hydraulic cylinders 515 and 516, respectively would position the individual rotary hay rakes in the desired operative position relative to the path of travel. More particularly, the operator would adjust the first and second hydraulic valves 711 and 712 in such a fashion so as to permit hydraulic pressure to be released from the first hydraulic conduit 701 and pass into the fourth and sixth hydraulic conduits 720 and 733, respectively. The hydraulic pressure upon entering the individual cylinder portions 520 causes the extendable portions to retract thereby further causing the individual support beams 540 to be moved into attitudes increasingly right-angularly related to the path of travel 23. This is most clearly seen by reference to FIG. 15. Upon positioning each of the rotary hay rakes 650 in a desired attitude relative to the path of travel 23, the operator would then fix the support beams relative to the path of travel to prevent further rotational movement. To accomplish this the operator would insert a bolt or other such device through one of the orifices 466 which is formed in the plate 465 and through a corresponding orifice 556 which is formed in the pivot plate 550. After accomplishing this task, the individual support beams are disposed in fixed relation relative to the path of travel 23.

To adjust the rotary hay rakes 650 relative to the surface of the earth the operator would adjust the fifth and sixth hydraulic cylinders 630 and 631 in such a fashion so as to position the individual hay rakes in an operational relationship relative to the surface of the earth. To accomplish this, the operator would adjust the third and fourth hydraulic valves 713 and 714, respectively, so as to release hydraulic pressure from the first hydraulic conduit 701 and allow it to pass into the eighth hydraulic conduit and ninth hydraulic conduit 743 and 750, respectively. The hydraulic pressure so delivered to the individual hydraulic cylinders 630 and 631 causes the individual rotary hay rakes to move along the third path of travel 640 and into a position intermediate the first and second positions 641 and 642, respectively. Upon completion of this step, the operator would utilize the orientation assemblies, which are generally indicated by the numeral 610, in such a fashion so as to rotate the individual rotary hay rakes 650 thereby positioning the plurality of tine bars 686 in a proper attitude with respect to the surface of the earth 11 to accomplish the raking operation desired. Upon completion of this last step, the apparatus 400 is operable to be moved along the path of travel 23 to accomplish the desired raking operation. This is most clearly shown by reference to FIG. 14 wherein the apparatus 400 is adapted to rake inwardly, that is, to move the crop towards the path of travel. The hydraulic motors 690, of course, are rendered operable by the hydraulic system of the tractor, not shown, to rotate the plurality of tine bars 686 in a fashion well understood by those skilled in the art.

As best illustrated by reference to FIG. 15, the apparatus 400 is operable to be reconfigured in such a fashion so as to permit the individual rotary hay rakes 650 to be positioned in attitudes which would permit them individually to rake the crop in a direction away from the path of travel 23. To accomplish this, the individual rotary hay rakes 650 would be reversed from that shown in FIG. 14, that is, the rotary hay rake illustrated in FIG. 14 which is positioned on the right side of the apparatus 400 would be moved to the left side of the apparatus and vice versa. To accomplish this, the operator would support the main frame 430 and would remove the bolts 484 which individually secures each of the pivots 480 internally of the channels 463. Upon removing these bolts, and after releasing the distal ends 524 of the extendable portions or ram 523 from the receiving bracket 552, the individual support beams 540, as well as the earth engaging wheel assemblies 490, would be rendered operable for repositioning on the opposite side of the apparatus 400. Upon being positioned on the opposite side of the apparatus, the steps previously disclosed would be reversed and an adjustment of the individual rotary hay rakes would be conducted in the manner which was heretofore discussed.

Therefore, the apparatus of the subject invention affords the capability of having one or more work implements which can be adjusted relative to a direction of travel for the performance of a specific work operation, and which can be easily and conveniently readjusted relative to each other without substantial rearrangement or inconvenient disassembly of the work implement and further provides an apparatus which is fully capable of performing all such operations of the type heretofore described thereby eliminating the necessity of maintaining a plurality of individual devices each only suited to a single operation.

Although the invention has been herein shown and described in what are conceived to be the most practical and preferred embodiments, it is recognized that departures may be made therefrom within the scope of the invention which is not to be limited to the illustrative details disclosed.

Having described my invention, what I claim as new and desire to secure by Letters Patent is:

1. An apparatus for positioning a work implement for operation during movement along a first path of travel and in a selected operative position relative to said first path of travel, the apparatus comprising a frame adapted for earth traversing movement along the first path of travel and having forward and rearward facing portions;

means for mounting the work implement on the frame for motion relative to a predetermined axis through a range of selected operative positions, said mounting means including a pivot which is disposed in a substantially vertical attitude and a support beam borne by the pivot, mounting said work implement thereon and having a first end and a second end;

means for securing the work implement relative to said predetermined axis in a selected one of said operative positions for operation during movement of the frame along said path of travel, said securing means including an hydraulic cylinder interconnecting the frame and the support beam whereby extension and contraction of the hydraulic cylinder causes the support beam selectively to be positioned relative to the direction of movement, a plate having a plurality of orifices disposed in preselected positions mounted on the frame, an orifice formed in the support beam whereby movement of the support beam about said predetermined axis causes the orifice formed in the support beam to align with one of the orifices formed in the plate, a bolt adapted to be received in the orifices so aligned thereby securing the support beam and the work implement borne thereby in one of the selected positions relative to the path of travel; and a towing assembly adapted selectively to be mounted on the forward and rearward facing portions of the frame, said towing assembly, when mounted on the forward facing portion of the frame, adapted to move the frame in a first direction along the first path of travel, and, when mounted on the second portion of the frame, adapted to move the frame in a second direction along the first path of travel, whereby the hydraulic cylinder, when substantially fully extended, positions the support beam in substantially parallel relation to the direction of travel and, upon contraction and when the frame is moved in the first direction, causes the first end of the support beam to move toward the towing assembly, and, when the frame is moved in the second direction, causes the first end of the support beam to move away from the towing assembly.

2. The apparatus of claim 1 wherein the mounting means further includes:
a. a spindle rotatably borne by the support beam;
b. an arm mounted on the spindle and mounting the work implement for positioning along a second path of travel;
c. a shaft mounted on the spindle and disposed in substantially coaxial alignment with the arm; and
d. power means interconnecting the support beam and the shaft and operable upon extension and contraction selectively to position the work implement along said second path of travel.

3. The apparatus of claim 2 wherein the power means includes a pneumatic cylinder having a range of expansion and contraction which limits the range of movement of the arm along the second path of travel, the pneumatic cylinder upon contraction permitting the arm to move into a lowermost position along the second path of travel the pneumatic cylinder exerting sufficient force on the shaft substantially to counterbalance the effect of gravity acting on the work implement, and upon expansion moving the arm along the second path of travel and into an uppermost position.

4. The apparatus of claim 3 wherein the work implement is a wheel rake, and the support beam is mounted for movement in a substantially circular path of travel.

5. In an apparatus having a frame with a forward portion and a rearward portion adapted for earth traversing movement along a path of travel and mounting a wheel rake for positioning in an operable position relative to the path of travel, the apparatus comprising a support member, having a proximal end and a distal end, mounted on said frame at the proximal end thereof;

a pivot, having a first end and a second end, mounted on the distal end of the support member by said first end of the pivot in a substantially vertical attitude;

earth traversing means mounted on the second end of the pivot for supporting the frame in the path of travel;

a support beam borne by the pivot and mounting the wheel rake for positioning relative to said path of travel, the support beam mounting a bearing housing having a passageway adapted to receive the pivot to mount the support beam on the pivot in substantially parallel spaced relation to the earth surface for movement in a substantially circular path thereabout and the bearing housing having a top surface with at least one orifice disposed in a predetermined location;

means for securing the work implement relative to said path of travel in a plurality of selected operative positions for operation during movement of the frame along said path of travel, said securing means including a plate mounted on the support member and having a plurality of orifices therein disposed in predetermined locations, whereby the orifice formed in said bearing housing and the orifices formed in the plate are periodically, sequentially disposed in substantial registry upon rotation of the support beam about the pivot, and a locking member receivable in said orifices when disposed in substantial registry to secure the support beam in a selected position on the pivot; and a towing assembly adapted selectively to be mounted on said forward portion and, alternatively, said rearward portion of the towing assembly whereby, when the towing assembly is mounted on said forward portion, the frame is thereby adapted for movement in a first direction along the first path of travel and, when the towing assembly is mounted on said rearward portion, the frame is thereby adapted for movement in a second direction, opposite to said first direction, along the first path of travel.

6. The apparatus of claim 5 wherein a support bracket is mounted on the support member; and the means for securing the work implement further includes an hydraulic cylinder which is mounted on the support bracket and the support beam, the bracket mounting the hydraulic cylinder in such a position whereby it is operable to move the support beam along the circular path of movement and into selected positions relative to the first path of travel.

7. The apparatus of claim 6 wherein a spindle is mounted for rotational movement on the bearing housing and an arm and a shaft are mounted on the spindle, the arm and the shaft individually disposed in substantially normal attitudes with respect to the spindle, and disposed in substantially coaxial alignment one with the other, the arm adapted to move along an arcuately shaped second path of travel; and the wheel rake is rotatably mounted on the arm for selective movement along the second path of travel.

8. The apparatus of claim 7 wherein a support frame is mounted on the support beam and is disposed in predetermined spaced relation to the bearing housing, and a pneumatic cylinder is mounted on the support frame and has a portion mounted on the shaft whereby upon contraction of the pneumatic cylinder, the wheel rake is moved along the second path of travel toward a work surface, the pneumatic cylinder counterbalancing the effect of gravity acting on the wheel rake such that the wheel rake is resiliently retained at a lowermost position along the second path of travel, and, upon expansion of the pneumatic cylinder, the wheel rake is moved along the second path of travel away from the work surface.

9. The apparatus of claim 8 wherein the support beam positions the hay rake in outwardly disposed relation relative to the frame when said support beam is moved in the first direction along the first path of travel, and the support beam positions the hay rake in inwardly disposed relation, relative to the frame, when said support beam is moved in the second direction along the first path of travel.

10. The apparatus of claim 9 wherein the support beam has a first and a second end and during movement of the frame in the first direction along the first path of travel the hydraulic cylinder positions the support beam such that when the hydraulic cylinder is substantially fully extended, the support beam is disposed in a position substantially parallel to the direction of travel, and as the hydraulic cylinder is contracted from said fully extended position the first end of the support beam is moved toward the towing assembly and into a position right-angularly related to the first direction of travel.

11. In an apparatus having a frame adapted for earth traversing movement along a path of travel and mounting a work implement for positioning in an operable position relative to the path of travel, the apparatus comprising a support member, having a proximal end and a distal end, mounted on said frame at the proximal end thereof;

a pivot, having a first end and a second end, the first end mounted on said support member at the distal end thereof;

earth traversing means mounted on the second end of the pivot for supporting the frame in the path of travel;

a support beam borne by the pivot and mounting the work implement for positioning relative to said path of travel;

means for securing the work implement relative to said path of travel in a plurality of selected operative positions for operation during movement of the frame along said path of travel, the securing means further including a first hydraulic cylinder mounted on the support member and having a portion connected to the support beam, the first hydraulic cylinder operable upon expansion and contraction selectively to position the work implement in operational positions relative to said first path of travel;

means interconnecting the support beam and the work implement for positioning the work implement relative to a work surface through a range of selected operative positions, said positioning means including (A.) a carriage having an arm mounted on the support beam and connected to the work implement, the arm rotatably movable along a third path of travel;

(B.) an adjustment assembly borne by the arm and having a movable member connected with the work implement, the adjustment assembly, upon extension and contraction, moving the work implement relative to the work surface;

(C.) power means, including a second hydraulic cylinder, interconnecting the support beam and the carriage operable, upon expansion and contraction, to position the work implement along said third path of travel and thereby moving said work implement relative to the work surface; and (D.) a linking arm interconnecting the support beam and the work implement and operable to retain the work implement in the third path of travel;

whereby the first hydraulic cylinder when substantially fully extended positions the support beam in substantially parallel relation to the first path of travel, and when the first hydraulic cylinder is contracted from said fully extended position the support beam moves into a position right-angularly related to the first path of travel.

12. The apparatus of claim 11 wherein the frame has opposite left and right sides and the work implement is mounted in a first position relative to the left side of the frame and is mounted in a second position relative to the right side of the frame.

13. An apparatus for positioning a work implement comprising a frame adapted for movement over the earth surface; means mounting the work implement on the frame for movement toward and from the earth surface along a path of travel; and a pneumatic system, containing a gas under pressure, mounted on the frame and operatively connected to the work implement for retaining the work implement substantially in a predetermined position in said path of travel resiliently counterbalanced in said predetermined position by said gas within the pneumatic system.

14. The apparatus of claim 13 wherein the pneumatic system includes a pneumatic cylinder assembly mounted on the frame and operatively connected to the work implement so that contraction of the pneumatic cylinder assembly causes the work implement to be moved along the path of travel toward the earth surface and expansion of the pneumatic cylinder assembly causes the work implement to be moved along the path of travel from the earth surface.

15. The apparatus of claim 14 wherein a plurality of said work implements are mounted on the frame for individual movement toward and from the earth surface along individual paths of travel and said pneumatic system includes a plurality of said pneumatic cylinder assemblies individually interconnecting the frame and said work implements so that de-pressurization of the pneumatic system causes the work implements to be moved substantially in unison along the path of travel toward the earth surface and pressurization of the pneumatic system causes the work implements to be moved substantially in unison along the path of travel from the earth surface.

16. The apparatus of claim 13 wherein the pneumatic system includes a pneumatic cylinder assembly mounted on the frame and operatively connected to the work implement so that said gas under pressure is applied substantially only resiliently to counterbalance the force of gravity upon said work implement whereby force applied against the work implement in the reverse direction in said path of travel is absorbed by resulting movement of the work implement in said reverse direction.

17. An apparatus for positioning a work implement comprising a frame adapted for earth traversing movement along a path of travel and having forward and rearward portions; a pivot assembly mounted on the frame defining a substantially vertical axis of rotation thereabout; a support beam mounted on said pivot assembly for pivotal movement substantially about said axis of rotation and having a first end and an opposite second end; an hydraulic cylinder interconnecting the frame and the support beam; an hydraulic system borne by the frame operable to expand and alternatively to contract said hydraulic cylinder to move said support beam between a first position substantially parallel to said path of travel and a second position oblique to said path of travel; means for mounting the work implement on the support beam for application of the work implement during movement of the frame along said path of travel; and a towing assembly adapted alternatively for attachment to the forward and rearward portions of the frame for towing said frame alternatively in opposite directions in said path of travel whereby when said support beam is in said first position the apparatus has a confined width for passage along roadways and the like and when said support beam is in the second position, the work implement can be applied in one attitude during movement of the frame in one of said opposite directions along said path of travel and in a second attitude during movement of the frame in the other of said opposite directions along said path of travel.

* * * * *

UNITED STATES PATENT AND TRADEMARK OFFICE
CERTIFICATE OF CORRECTION

PATENT NO. : 4,932,197
DATED : June 12, 1990
INVENTOR(S) : David R. Allen

It is certified that error appears in the above-identified patent and that said Letters Patent is hereby corrected as shown below:

Column 7, Line 40
After "are" Insert ---operable to be mounted in a first position 151 wherein they are---

Column 8, Line 20
Delete "substantiallY" and Insert ---substantially---

Column 8, Line 39
Delete "pluralitY" and Insert ---plurality---

Column 13, Line 55
Delete "bY" and Insert ---by---

Column 15, Line 12
Delete "dimension" and Insert ---edge---

Column 17, Line 62
Delete "bY" and Insert ---by---

Column 26, Line 30
Delete "13" and Insert ---1---

UNITED STATES PATENT AND TRADEMARK OFFICE
CERTIFICATE OF CORRECTION

PATENT NO. : 4,932,197

DATED : June 12, 1990

INVENTOR(S) : David R. Allen

It is certified that error appears in the above-identified patent and that said Letters Patent is hereby corrected as shown below:

Column 27, Line 12
After "first" Insert ---position 641. The apparatus is now in the configuration shown in--

Signed and Sealed this

Twenty-first Day of January, 1992

*Attest:*

HARRY F. MANBECK, JR.

*Attesting Officer*      *Commissioner of Patents and Trademarks*